United States Patent
Zhao et al.

(10) Patent No.: US 12,437,816 B2
(45) Date of Patent: Oct. 7, 2025

(54) MEMORY, A MEMORY SYSTEM, AND A METHOD FOR OPERATING MEMORY

(71) Applicant: YANGTZE MEMORY TECHNOLOGIES CO., LTD., Wuhan (CN)

(72) Inventors: Xiangnan Zhao, Wuhan (CN); Hongtao Liu, Wuhan (CN); Chenhui Li, Wuhan (CN); Lei Jin, Wuhan (CN); Hua Tan, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 133 days.

(21) Appl. No.: 18/528,454

(22) Filed: Dec. 4, 2023

(65) Prior Publication Data
US 2025/0022519 A1    Jan. 16, 2025

(30) Foreign Application Priority Data
Jul. 10, 2023    (CN) .......................... 202310843938.9

(51) Int. Cl.
*G11C 16/28*      (2006.01)
*G06F 12/02*      (2006.01)
*G11C 16/04*      (2006.01)

(52) U.S. Cl.
CPC .......... *G11C 16/28* (2013.01); *G06F 12/0246* (2013.01); *G11C 16/0483* (2013.01)

(58) Field of Classification Search
CPC . G11C 16/28; G11C 16/0483; G11C 11/5642; G11C 16/26; G11C 16/10; G11C 16/12; G11C 16/34; G06F 12/0246

USPC .......................................... 365/185.2, 185.25
See application file for complete search history.

(56) References Cited

U.S. PATENT DOCUMENTS

| | | | | |
|---|---|---|---|---|
| 2003/0002318 A1* | 1/2003 | Kang | ...................... | G11C 11/22 365/145 |
| 2004/0257855 A1* | 12/2004 | Hilton | ...................... | G11C 11/15 365/150 |
| 2008/0279013 A1* | 11/2008 | Horch | ................ | G11C 16/0441 365/185.28 |
| 2010/0244960 A1* | 9/2010 | Takitani | ........... | H03K 3/356139 330/253 |
| 2011/0199812 A1* | 8/2011 | Kitagawa | ........... | G11C 13/0004 365/210.1 |
| 2011/0271156 A1* | 11/2011 | Chhabra | .............. | G11C 29/022 714/724 |

(Continued)

*Primary Examiner* — Michael T Tran
(74) *Attorney, Agent, or Firm* — Conley Rose, P.C.

(57) ABSTRACT

The present application discloses a memory, a memory system, and a method for operating memory, which belongs to the memory techniques field. The method for operating memory comprises determining a storage state of a reference memory cell, determining a discharge duration of a sensing node corresponding to a target memory cell based on the storage state of the reference memory cell, and reading the target memory cell based on the discharge duration of the sensing node corresponding to the target memory cell to obtain read results. The target memory cell and the reference memory cell are located in the same string and are adjacent, and the programming order of the reference memory cell is after that of the target memory cell. The present application may reduce the influence on reading memory cells by interlayer interference and improve the accuracy of reading memory cells.

19 Claims, 14 Drawing Sheets

(56) References Cited

U.S. PATENT DOCUMENTS

| | | | |
|---|---|---|---|
| 2012/0155177 A1* | 6/2012 | Wang | G11C 16/28 |
| | | | 365/185.21 |
| 2014/0293685 A1* | 10/2014 | Noguchi | G11C 11/1655 |
| | | | 365/158 |
| 2018/0374541 A1* | 12/2018 | Jung | G11C 16/0483 |
| 2021/0183445 A1* | 6/2021 | Di Vincenzo | G11C 11/2255 |
| 2022/0406343 A1* | 12/2022 | Chiu | G11C 7/12 |

* cited by examiner

MEMORY, A MEMORY SYSTEM, AND A METHOD FOR OPERATING MEMORY

CROSS-REFERENCE TO RELATED APPLICATIONS

The present application claims priority to Chinese Patent Application No. 2023108439389, which was filed Jul. 10, 2023, is titled "MEMORY, STORAGE SYSTEM AND MEMORY OPERATING METHOD," and is hereby incorporated herein by reference in its entirety.

TECHNICAL FIELD

The present application relates to the technical field of memory techniques—in particular, to a memory, a memory system, and a method for operating the memory.

BACKGROUND

With the advancement of memory (for example, 3D NAND flash memory chips) processing technology, in order to increase the storage capacity of the memory, memory cells in memory are becoming more dense, which leads to more and more obvious interlayer interference in the memory.

Interlayer interference refers to such a situation that an edge electric field generated when programming the memory cells coupled to any word line in the memory may affect the number of electrons stored in the adjacent and programmed memory cells coupled to the word lines and further cause the threshold voltage of the programmed memory cell to change.

SUMMARY

The implementations of the present disclosure provide a memory, a memory system, and a method for operating memory, which may reduce the influence on reading the memory cells by interlayer interference and improve the accuracy of reading the memory cells. The technical solutions are as follows:

In the first aspect, a method for operating a memory is provided. The method comprises: determining a storage state of a reference memory cell; determining a discharge duration of a sensing node corresponding to a target memory cell based on the storage state of the reference memory cell; and reading the target memory cell based on the discharge duration of the sensing node corresponding to the target memory cell, to obtain read result. In this first aspect, the target memory cell and the reference memory cell are located in a same string and are adjacent, and the programming order of the reference memory cell is after that of the target memory cell.

Optionally, determining a discharge duration of a sensing node corresponding to the target memory cell based on the storage state of the reference memory cell comprises determining a storage state range in which the storage state of the reference memory cell is located. In this implementation, the storage state range includes a first storage state range and a second storage state range, and storage states in the first storage state range are lower than storage states in the second storage state range; and determining the discharge duration of the sensing node corresponding to the target memory cell according to the storage state range of the reference memory cell.

Optionally, a discharge duration corresponding to the first storage state range is smaller than a default discharge duration of the sensing node, and a discharge duration corresponding to the second storage state range is larger than the default discharge duration of the sensing node.

Optionally, determining a storage state of a reference memory cell comprises reading the reference memory cell based on a default discharge duration of the sensing node to obtain the storage state of the reference memory cell.

Optionally, before determining a storage state of a reference memory cell, the method further comprises: reading a page where the target memory cell is located; and performing a default-read hard decoding in response to a fail bit count (FBC) of the page being greater than a first preset value. In this implementation, determining a storage state of a reference memory cell includes determining the storage state of the reference memory cell in response to performing the default-read hard decoding fails.

Optionally, before determining a storage state of a reference memory cell, the method further comprises performing a best-read hard decoding in response to performing of the default-read hard decoding fails. In this implementation, determining a storage state of a reference memory cell comprises determining the storage state of the reference memory cell in response to performing the best-read hard decoding fails and reading the target memory cell based on the discharge duration of the sensing node corresponding to the target memory cell comprises reading the target memory cell based on the discharge duration of the sensing node corresponding to the target memory cell and a best-read voltage.

Optionally, before determining a storage state of a reference memory cell, the method further comprises: performing a best-read hard decoding in response to performing of the default-read hard decoding failure; and performing a best-read soft decoding in response to performing of the best-read hard decoding fails. In this implementation, determining a storage state of a reference memory cell comprises determining the storage state of the reference memory cell in response to performing the best-read soft decoding fails.

Optionally, reading the target memory cell based on the discharge duration of the sensing node corresponding to the target memory cell to obtain read result comprises: reading the target memory cell based on the discharge duration of the sensing node corresponding to the target memory cell, a first soft read voltage less than a best-read voltage and a second soft read voltage larger than the best-read voltage, to obtain soft data corresponding to the target memory cell; and determining the read result corresponding to the target memory cell based on the soft data and hard data corresponding to the target memory cell. In this implementation, the hard data corresponding to the target memory cell is obtained by reading the target memory cell based on the best-read voltage.

Optionally, the hard data corresponding to the target memory cell is obtained by reading the target memory cell based on the discharge duration of the sensing node corresponding to the target memory cell and the best-read voltage.

In a second aspect, a memory is provided. The memory comprises: a memory cell array comprising a plurality of strings, wherein the strings comprise a plurality of memory cells; a peripheral circuit coupled to the memory cell array and configured to: determine a storage state of a reference memory cell; determine a discharge duration of a sensing node corresponding to a target memory cell based on the storage state of the reference memory cell; and read the target memory cell based on the discharge duration of the sensing node corresponding to the target memory cell, to obtain read result. In this aspect, the target memory cell and the reference memory cell are located in a same string and are adjacent, and programming order of the reference memory cell is after that of the target memory cell.

Optionally, the peripheral circuit is configured to: determine a storage state range in which the storage state of the reference memory cell is located, wherein the storage state range includes a first storage state range and a second storage state range, and storage states in the first storage state range are lower than storage states in the second storage state range; and determine the discharge duration of the sensing node corresponding to the target memory cell according to the storage state range of the reference memory cell.

Optionally, a discharge duration corresponding to the first storage state range is smaller than a default discharge duration of the sensing node, and a discharge duration corresponding to the second storage state range is larger than the default discharge duration of the sensing node.

Optionally, the peripheral circuit is configured to: read the reference memory cell based on a default discharge duration of the sensing node to obtain the storage state of the reference memory cell.

Optionally, the peripheral circuit is further configured to: read a page where the target memory cell is located; perform a default-read hard decoding in response to a fail bit count (FBC) of the page being greater than a first preset value; and determine the storage state of the reference memory cell in response to performing the default-read hard decoding fails.

Optionally, the peripheral circuit is further configured to: perform a best-read hard decoding in response to performing of the default-read hard decoding fails; determine the storage state of the reference memory cell in response to performing of the best-read hard decoding fails; and read the target memory cell based on the discharge duration of the sensing node corresponding to the target memory cell and a best-read voltage.

Optionally, the peripheral circuit is further configured to: perform a best-read hard decoding in response to performing of the default-read hard decoding fails; perform a best-read soft decoding in response to performing of the best-read hard decoding fails; and determine the storage state of the reference memory cell in response to performing of the best-read soft decoding fails.

Optionally, the peripheral circuit is further configured to: read the target memory cell based on the discharge duration of the sensing node corresponding to the target memory cell, a first soft read voltage less than a best-read voltage and a second soft read voltage larger than the best-read voltage, to obtain soft data corresponding to the target memory cell; and determine the read result corresponding to the target memory cell based on the soft data and hard data corresponding to the target memory cell, wherein the hard data corresponding to the target memory cell is obtained by reading the target memory cell based on the best-read voltage.

Optionally, the hard data corresponding to the target memory cell is obtained by reading the target memory cell based on the discharge duration of the sensing node corresponding to the target memory cell and the best-read voltage.

In a third aspect, a memory system is provided. The memory system comprises: one or more memories according to the second aspect; and a memory controller coupled to the memory and configured to control the memory.

The technical solutions provided by the implementations of the present application may bring the following beneficial effects:

In the implementations of the present application, the discharge duration of the sensing node corresponding to the target memory cell may be determined first according to the storage state of the reference memory cell. Then, the target memory cell may be read according to the determined discharge duration. Since the storage state of the reference memory cell is related to the programming voltage applied to the reference memory cell, the storage state of the reference memory cell can reflect the extent to which the target memory cell is influenced by interlayer interference. Therefore, in the implementations of the present application, the discharge duration of the sensing node is determined through the storage state of the reference memory cell so that the influence on the target memory cell by the interlayer inference is reduced by adjusting the discharge duration of the sensing node. Thus, the accuracy of reading the target memory cell may be improved.

BRIEF DESCRIPTION OF THE DRAWINGS

In order to more clearly illustrate the technical solutions of the implementations of the present application, brief descriptions are given below for the drawings needed to be used in the description of the implementations. It is obvious that the drawings described below are only some of the implementations of the present application, and other drawings may be derived based on these drawings without creative effort by those of ordinary skill in the art.

DETAILED DESCRIPTION

To make the purposes, technical solutions, and advantages of the present application more clear, the implementations of this application are further described in detail below with reference to the drawings.

Figure 1:
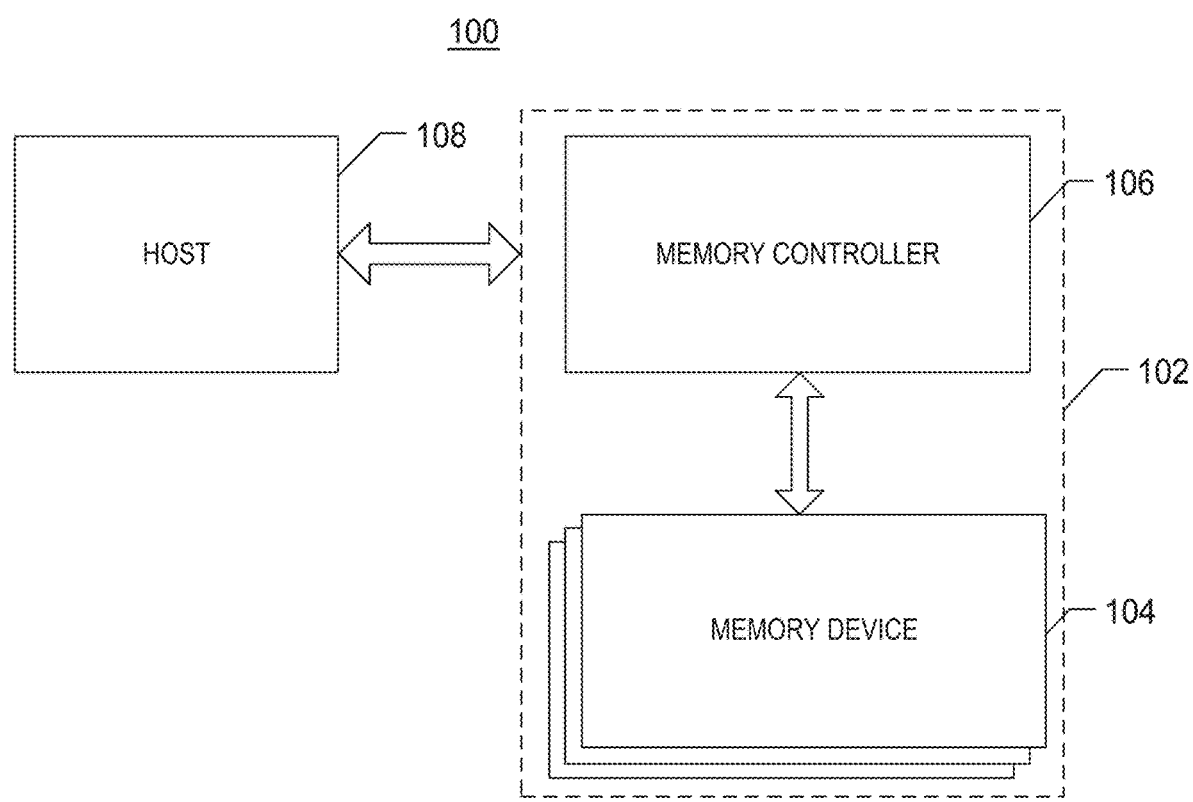
FIG. 1 is a schematic diagram of an exemplary system having a memory device provided by an implementation of the present application.

FIG. 1 illustrates a block diagram of an exemplary system 100 having a memory device according to an implementation of the present application. System 100 may be a mobile phone, desktop computer, laptop computer, tablet computer, vehicle computer, game console, printer, positioning device, wearable electronic device, smart sensor, virtual reality (VR) device, augmented reality (AR) device, or any other suitable electronic device having memory devices therein. As shown in FIG. 1, system 100 may include a host 108 and a memory system 102 having one or more memory devices 104 and a memory controller 106. Host 108 may be a processor of an electronic device (e.g., central processing unit (CPU)) or a system-on-chip (SoC) (e.g., an application processor (AP)). Host 108 may be configured to send data to or receive data from memory device 104.

Memory device 104 may be any memory device disclosed in this application. As disclosed in detail below, memory device 104 (e.g., a NAND flash memory device (e.g., a three-dimensional (3D) NAND flash memory device)) may have reduced leakage current from a driver transistor (e.g., string driver) coupled to an unselected word line during an erasure operation, which allows further reduction of the size of drive transistors.

According to some implementations, memory controller 106 is coupled to memory device 104 and host 108 and is configured to control the memory device 104. Memory controller 106 may manage data stored in memory device 104 and communicate with host 108. In some implementations, memory controller 106 is designed to operate in low-duty cycle environments, such as secure digital (SD) card, compact flash (CF) card, universal serial bus (USB) flash drive, or other media used in electronic devices such as personal computers, digital cameras, mobile phones, and the like. In some implementations, memory controller 106 is designed to operate in high-duty cycle environments in solid-state drives (SSD) or an embedded MultiMediaCard (eMMC). SSD or eMMC may be used as data storage for mobile devices such as smartphones, tablet computers, laptops, and the like, as well as enterprise memory arrays.

Memory controller 106 may be configured to control operations of the memory device 104, such as read, erase, and program processing. Memory controller 106 may also be configured to manage various functions relating to data stored or stored in memory device 104, including, but not limited to, bad block management, garbage collection, logic to physical address translation, wear leveling, and the like. In some implementations, the memory controller 106 is further configured to process error correction codes (ECC) with respect to data read from or written to memory device 104. Memory controller 106 may also perform any other suitable function, such as formatting memory device 104. Memory controller 106 may communicate with an external device (e.g., host 108) according to a particular communication protocol. For example, memory controller 106 may communicate with an external device through at least one of various interface protocols, such as USB protocol, MultiMediaCard (MMC) protocol, Peripheral Component Interconnect (PCI) protocol, PCI express (PCI-E) protocol, Advanced Technology Attachment (ATA) protocol, serial ATA protocol, parallel ATA protocol, Small Computer System Interface (SCSI) protocol, Enhanced Small Disk Interface (ESDI) protocol, Integrated Drive Electronics (IDE) protocol, Fire Wire protocol, and the like.

Figure 3:
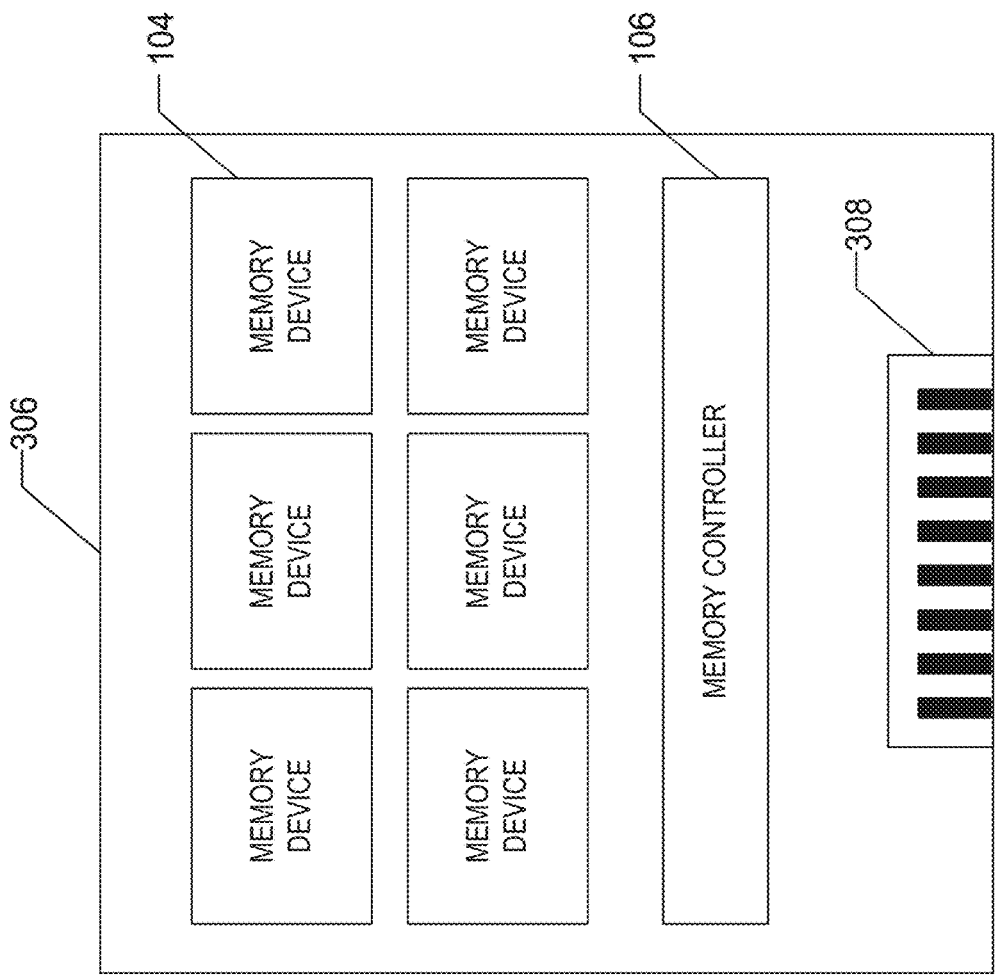
FIG. 3 is a schematic diagram of an exemplary solid-state drive with a memory device provided by an implementation of the present application.
Figure 2:
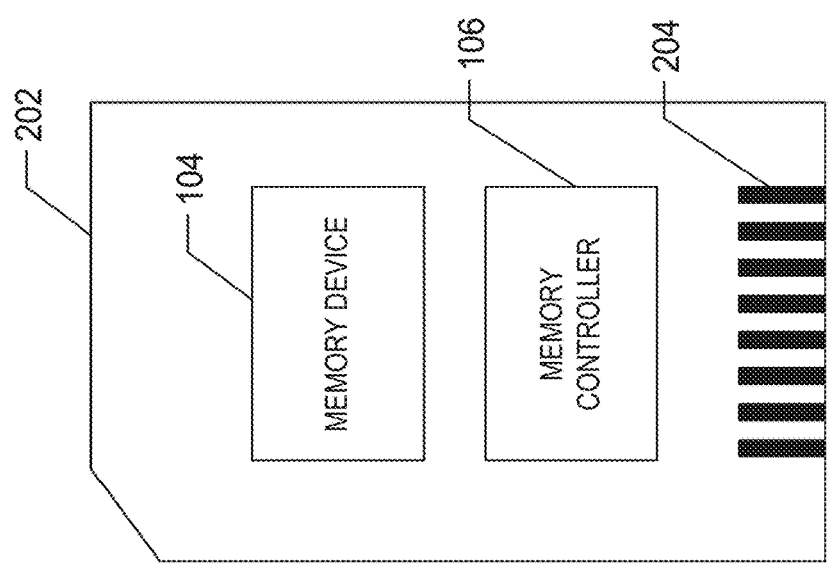
FIG. 2 is a schematic diagram of an exemplary memory card having a memory device provided by an implementation of the present application.

Memory controller 106 and one or more memory devices 104 may be integrated into various types of memory devices, for example, incorporated in the same package (e.g., Universal Flash Storage (UFS) package or eMMC package). That is, memory system 102 may be implemented and encapsulated in different types of terminal electronic products. In one example, as shown in FIG. 2, a memory controller 106 and a single memory device 104 may be integrated into a memory card 202. The memory card 202 may include a PC card (PCMCIA, Personal Computer Memory Card International Association), a CF card, a smart media (SM) card, a memory stick, a MultiMediaCard (MMC, RS-MMC, MMCmicro), an SD card (SD, miniSD, microSD, SDHC), a UFS, and the like. The memory card 202 may also include a memory card connector 204 that couples the memory card 202 to a host (e.g., host 108 in FIG. 1). In another example, as shown in FIG. 3, the memory controller 106 and a plurality of memory devices 104 may be integrated into SSD 306. The SSD 306 may also include an SSD connector 308 that couples the SSD 306 to a host (e.g., host 108 in FIG. 1). In some implementations, the storage capacity and/or operating speed of the SSD 306 is greater than those of the memory card 202.

Figure 4:
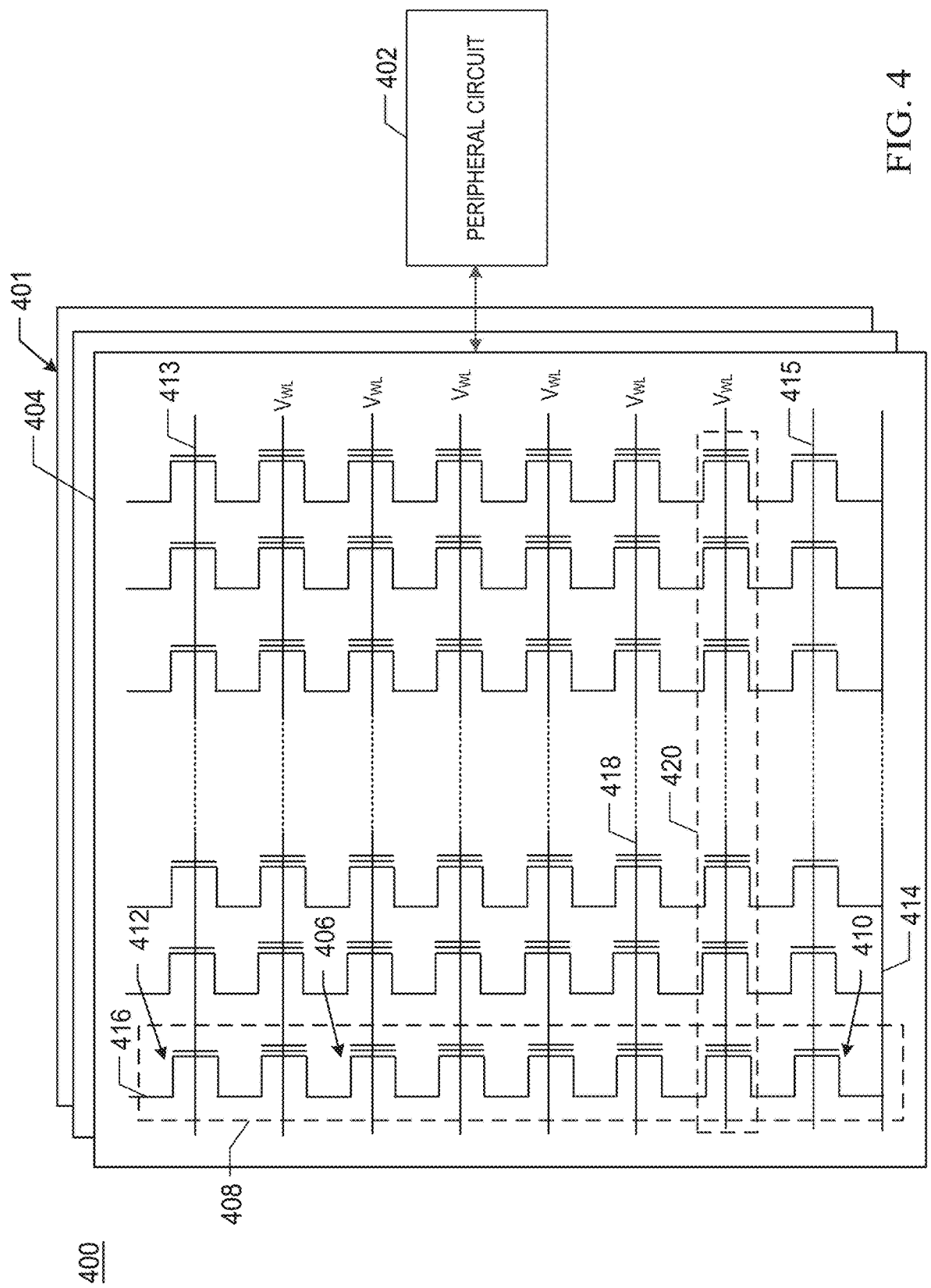
FIG. 4 is a schematic circuit diagram of a memory device including a peripheral circuit provided by an implementation of the present application.

FIG. 4 shows a schematic circuit diagram of an exemplary memory device 400, including a peripheral circuit according to some aspects of this application. The memory device 400 may be an example of the memory device 104 shown in FIG. 1. The memory device 400 may include a memory cell array device 401 and a peripheral circuit 402 coupled to the memory cell array device 401. The memory cell array device 401 may be a NAND flash memory cell array, in which memory cells 406 are provided in the form of an array of NAND strings 408, with each NAND string 408 extending vertically above a substrate (not shown). In some implementations, each NAND string 408 includes multiple memory cells 406 coupled in series and stacked vertically. Each memory cell 406 may hold a continuous analog value, e.g., a voltage or charge, depending on the quantity of electrons trapped within an area of the memory cell 406. Each memory cell 406 may be a floating-gate type memory cell, including a floating gate transistor, or a charge-trapping type memory cell, including a charge-trapping transistor.

In some implementations, each memory cell 406 may be a single-level cell (SLC) having two possible storage states and, therefore, capable of storing one bit of data. For example, a first storage state "0" may correspond to a first voltage range, and a second storage state "1" may correspond to a second voltage range. In some implementations, each memory cell 406 may be a multi-level cell (MLC) capable of storing more than a single bit of data in more than four memory states. For example, MLC can store two bits per cell, three bits per cell (also known as Triple-Level Cell (TLC)) or four bits per cell (also known as Quad-Level Cell (QLC)). Each MLC may be programmed to take a range of possible nominal stored values. In one example, if each MLC stores two bits of data, the MLC may be programmed to take one of three possible programming levels from the erasure state by writing one of three possible nominal stored values to the cell. The fourth nominal stored value may be used for the erasure state.

As shown in FIG. 4, each NAND string 408 may include a source select gate (SSG) 410 at its source terminal and a drain select gate (DSG) 412 at its drain terminal. The SSG 410 and DSG 412 may be configured to activate the selected NAND string 408 during read and program processing. In some implementations, the sources of the NAND strings 408 in the same block 404 are coupled by the same source line (SL) 414 (e.g., a common SL). In other words, according to some implementations, all NAND strings 408 in the same block 404 may have an array common source (ACS). According to some implementations, the DSGs 412 of each NAND string 408 are coupled to a respective bit line 416, and the data may be read from or written into bit line 416 via an output bus (not shown). In some implementations, each NAND string 408 is configured to be selected or deselected by applying a select voltage (e.g., higher than the threshold voltage of the transistor having the DSG 412) or a deselect voltage (e.g., 0V) to the respective DSG 412 via one or more DSG lines 413 and/or by applying a select voltage (e.g., higher than the threshold voltage of the transistor having the SSG 410) or a deselect voltage (e.g., 0V) to the respective SSG 410 via one or more SSG lines 415.

As shown in FIG. 4, the NAND strings 408 may be organized into a plurality of blocks 404, and each of the plurality of blocks 404 may have a common source line 414 (e.g., coupled to ground). In some implementations, each block 404 is a basic unit of data for an erase operation, i.e., all memory cells 406 on the same block 404 are erased at the same time. In order to erase the memory cells 406 in the selected block 404a, the source line 414 coupled to the selected block 404a and unselected block 404b on the same plane as the selected block 404a may be biased with an erase voltage (Vers) (e.g., a high positive voltage (e.g., 20V or higher)). It should be understood that in some examples, the erase operation may be performed at a half-block level, at a quarter-block level, or a level with any suitable number of blocks or any suitable fraction of blocks. The memory cells 406 of adjacent NAND strings 408 may be coupled by word lines 418, and the word lines 418 select which row of memory cells 406 is affected by read and program processing. In some implementations, each word line 418 is coupled to a page 420 of the memory cells 406, and the page 420 is a basic data unit for program processing. The size of one page 420 in bits may be related to the number of NAND strings 408 coupled by word lines 418 in one block 404. Each word line 418 may include a plurality of control gates (gate electrodes) and gate lines coupled to the control gates at each memory cell 406 in a respective page 420.

Figure 5:
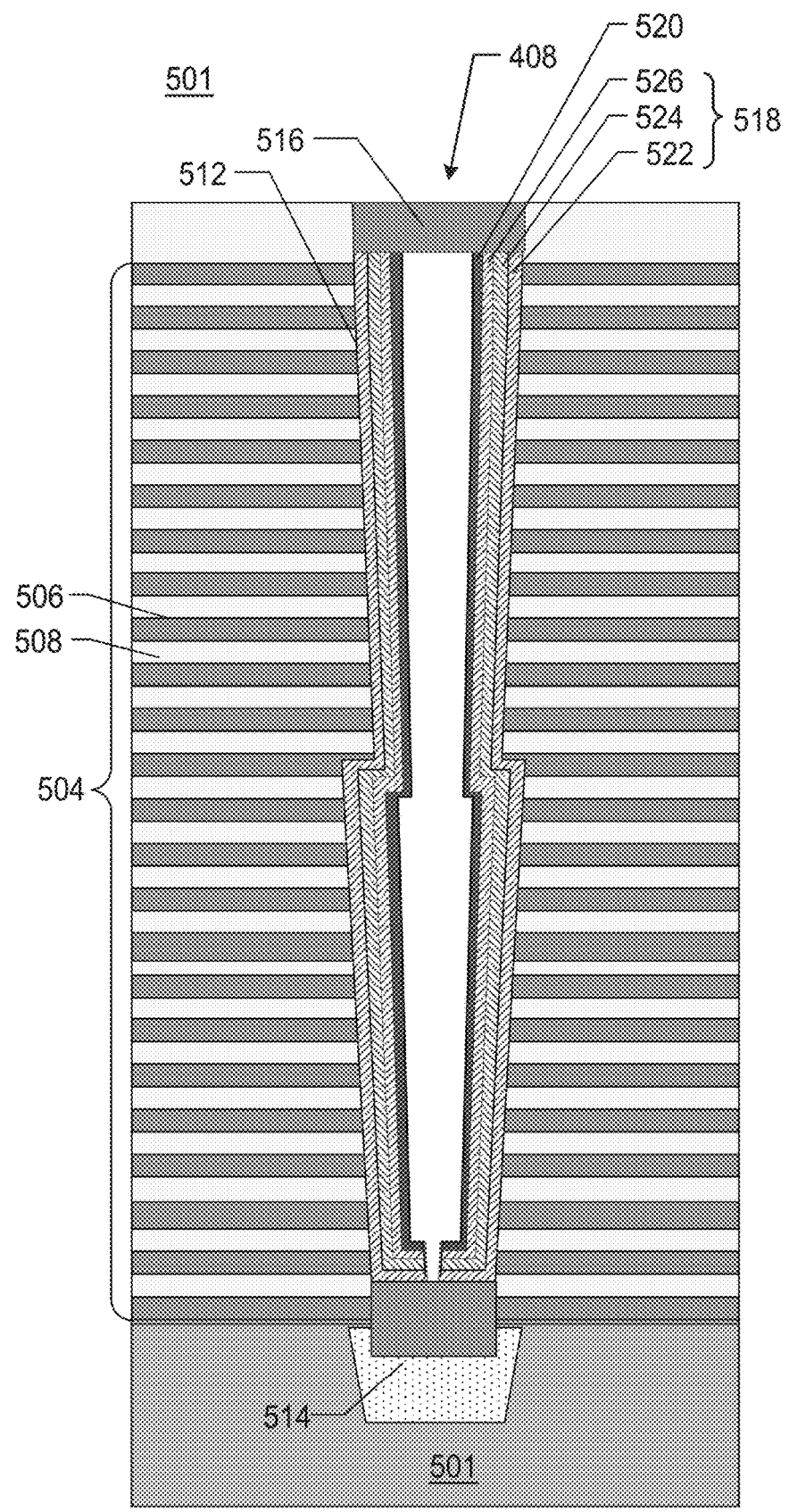
FIG. 5 is a schematic diagram of an exemplary memory cell array including NAND strings provided by an implementation of the present application.

FIG. 5 shows a cross-sectional side view of example memory cell array 401 including a NAND string 408 according to some aspects of the present disclosure. As shown in FIG. 5, the NAND string 408 may extend vertically above the substrate 501 through the memory stack layer 504. The substrate 501 may include silicon (e.g., monocrystalline silicon), silicon germanium (SiGe), gallium arsenide (GaAs), germanium (Ge), silicon on insulator (SOI), germanium on insulator (GOI), or any other suitable material.

The memory stack layer 504 may include alternating gate conductive layers 506 and gate-to-gate dielectric layers 508. The number of gate conductive layers 506 and gate-to-gate dielectric layers 508 pairs in the memory stack layer 504 may determine the number of memory cells 406 in the memory cell array 401. The gate conductive layer 506 may include conductive materials including but not limited to tungsten (W), cobalt (Co), copper (Cu), aluminum (Al), polysilicon, doped silicon, silicide, or any combination thereof. In some implementations, each gate conductive layer 506 includes a metal layer, such as a tungsten layer. In some implementations, each gate conductive layer 506 includes a doped polysilicon layer. Each gate conductive layer 506 may include a control gate around the memory cell 406 and may extend laterally at the top of the memory stack layer 504 as DSG line 413, extend laterally at the bottom of the memory stack layer 504 as SSG line 415, or extend laterally between the DSG line 413 and the SSG line 415 as word line 418.

As shown in FIG. 5, the NAND string 408 includes a channel structure 512 that extends vertically through the memory stack layer 504. In some implementations, the channel structure 512 includes a channel hole filled with (one or more types of) semiconductor material (e.g., as a semiconductor channel) and (one or more types of) dielectric material (e.g., as a memory film). In some implementations, the semiconductor channel 520 comprises silicon, such as polysilicon. In some implementations, the memory film 518 is a composite dielectric layer including a tunneling layer 526, a storage layer 524 (also referred to as a "charge trapping/storage layer"), and a barrier layer 522. The channel structure 512 may have a cylindrical shape (e.g., a pillar shape). According to some implementations, the semiconductor channel 520, the tunneling layer 526, the storage layer 524, and the barrier layer 522 are arranged radially from the center of the cylinder toward the outer surface of the cylinder sequentially. The tunneling layer 526 may include silicon oxide, silicon oxynitride, or any combination thereof. The storage layer 524 may include silicon nitride, silicon oxynitride, or any combination thereof. The barrier layer 522 may comprise a silicon oxide, silicon oxynitride, high dielectric constant (high k) dielectric, or any combination thereof. In one example, the memory film 518 may include a composite layer of silicon oxide/silicon oxynitride/silicon oxide (ONO).

According to some implementations, as shown in FIG. 5, a well 514 (e.g., P-well and/or N-well) is formed in the substrate 502, and the source terminal of NAND string 408 contacts with the well 514. For example, the source line 414 may be coupled to the well 514 to apply an erase voltage to the well 514 (i.e., the source of the NAND string 408) during an erase operation. In some implementations, the NAND string 408 also includes a channel plug 516 at the drain terminal of the NAND string 408. It should be understood that although not shown in FIG. 5, additional components of the memory cell array 401 may be formed, which include, but are not limited to, gate line slot/source contact, local contact, interconnect layer, and the like.

Figure 6:
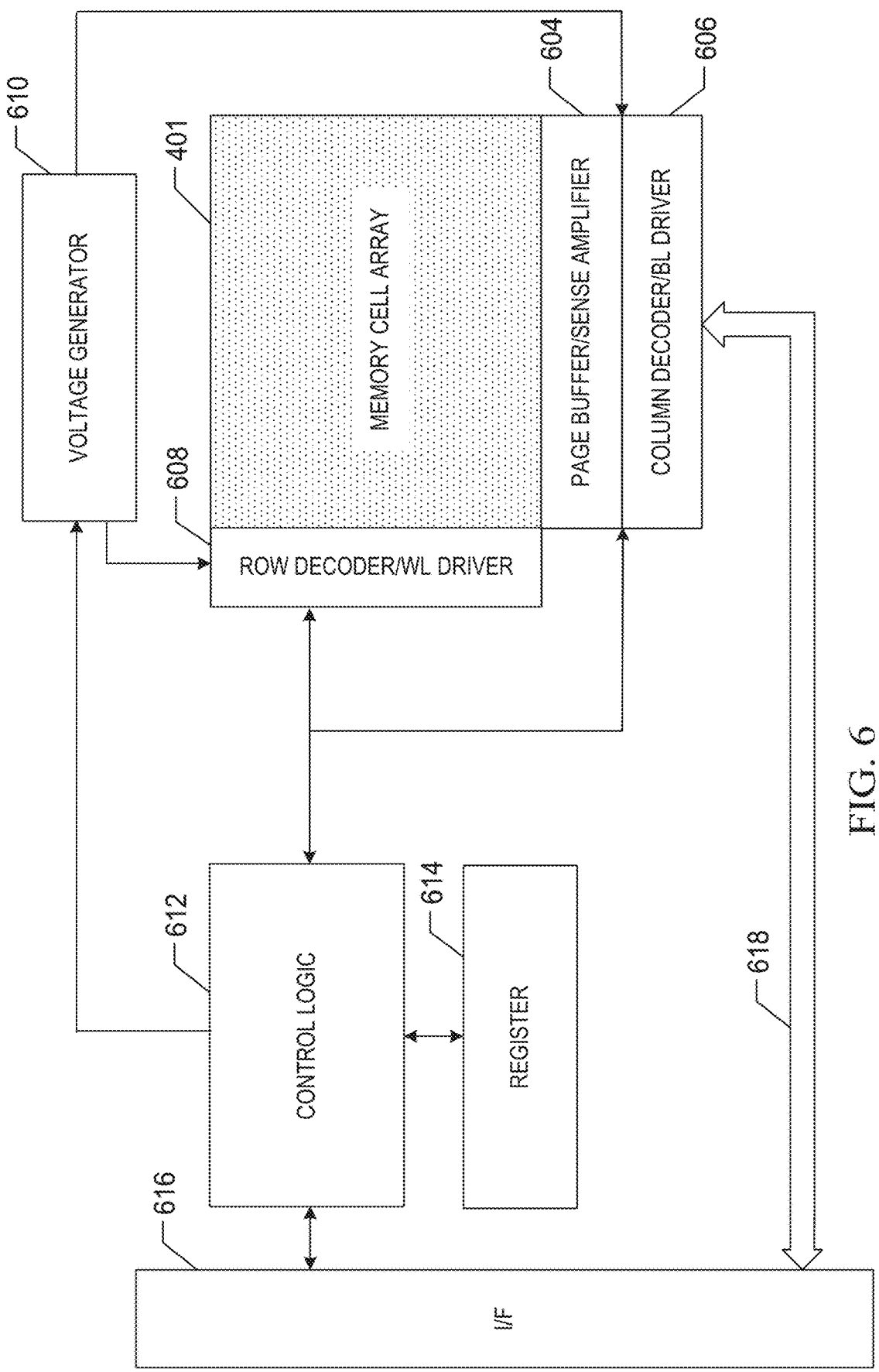
FIG. 6 is a schematic diagram of an exemplary memory device including a memory cell array and a peripheral circuit provided by an implementation of the present application.

Referring back to FIG. 4, the peripheral circuit 402 may be coupled to the memory cell array 401 through the bit line 416, the word line 418, the source line 414, the bottom select gate (BSG) line 415, and the top select gate (TSG) line 413. The peripheral circuit 402 may include any suitable analog, digital, and mixed-signal circuit for facilitating the operation of the memory cell array 401 by applying and sensing voltage signals and/or current signals to and from each target memory cell 406 via the bit line 416, the word line 418, the source line 414, the SSG line 415, and the DSG line 413. Peripheral circuit 402 may include various types of peripheral circuits formed using metal-oxide-semiconductor (MOS) technology. For example, FIG. 6 shows some exemplary peripheral circuits. The peripheral circuit 402 may include a page buffer/sense amplifier 604, a column decoder/bit line driver 606, a row decoder/word line driver 608, a voltage generator 610, the control logic unit 612, register 614, interface 616, and data bus 618. It should be understood that, in some examples, additional peripheral circuits not shown in FIG. 6 may also be included.

The page buffer/sense amplifier 604 may be configured to read data from the memory cell array 401 and program (write) data to the memory cell array 401 based on a control signal from the control logic unit 612. In one example, the page buffer/sense amplifier 604 may store a page of program data (write data) to be programmed into one page 420 of the memory cell array 401. In another example, the page buffer/sense amplifier 604 may perform a program to verify the operation to ensure that data has been properly programmed into the memory cell 406 coupled to the selected word line 418. In yet another example, the page buffer/sense amplifier 604 may also sense low power signals from the bit line 416 representing data bits stored in memory cells 406 and amplify small voltage swings to recognizable logic levels in a read operation. The column decoder/bit line driver 606 may be configured to be controlled by the control logic unit 612 and select one or more NAND strings 408 by applying a bit line voltage generated from the voltage generator 610.

The row decoder/word line driver 608 can be configured to be controlled by the control logic unit 612, to select/deselect a block 404 of the memory cell array 401, and to select/deselect word line 418 of the block 404. The row decoder/word line driver 608 may also be configured to drive the word line 418 using the word line voltage generated from the voltage generator 610. In some implementations, the row decoder/word line drivers 608 may also select/deselect and drive the SSG line 415 and DSG line 413. As described in detail below, the row decoder/word line driver 608 is configured to perform an erase operation on the memory cell 406 coupled to the selected word line(s) 418. The voltage generator 610 may be configured to be controlled by the control logic unit 612 and generate a word line voltage (e.g., a read voltage, a program voltage, a pass voltage, a local voltage, a verify voltage, etc.), a bit line voltage, and a source line voltage to be supplied to the memory cell array 401.

The control logic unit 612 may be coupled to each peripheral circuit described above and configured to control the operation of each peripheral circuit. The register 614 may be coupled to the control logic unit 612 and include a status register, a command register, an address register for storing status information, a command operation code (OP code), and a command address for controlling the operation of each peripheral circuit. Interface 616 may be coupled to the control logic unit 612 and act as a control buffer to buffer control commands received from a host (not shown) and relay them to the control logic unit 612 and to buffer status information received from the control logic unit 612 and relay it to the host. The interface 616 may also be coupled to the column decoder/bit line driver 606 via data bus 618 and act as a data I/O interface and data buffer—to buffer data and relay it to the memory cell array 401 or relay or buffer data from the memory cell array 401.

Figure 7:
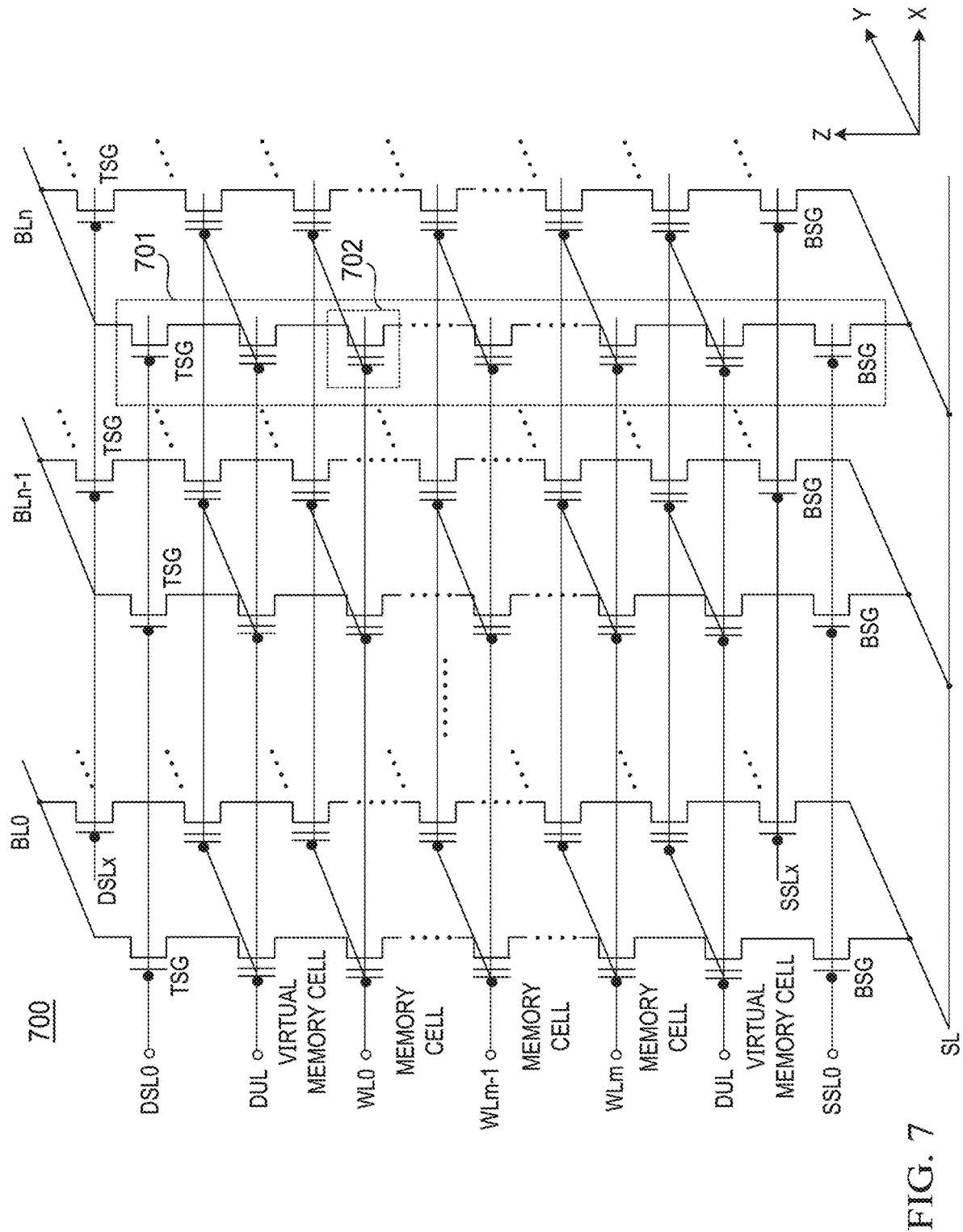
FIG. 7 is a schematic diagram of a 3D NAND provided by an implementation of the present application.

FIG. 7 is a structure schematic diagram of a memory device of the present application, which may be a 3D NAND flash memory chip (hereinafter referred to as 3D NAND). As shown in FIG. 7, the 3D NAND includes a plurality of strings 701 arranged in a direction parallel to a bearing surface of a substrate (i.e., an XY plane in FIG. 7). Each string 701 includes a plurality (e.g., 32 or 64) of memory cells in series arranged in a direction perpendicular to the bearing surface of the substrate (i.e., direction Z in FIG. 7). Thereby, the plurality of memory cells included in the memory cell array device may form a three-dimensional array arrangement on the substrate to form a memory array.

As shown in FIG. 7, each string 701 also includes an upper selectron connected to the drain of the first memory cell and a lower selectron connected to the source of the last memory cell. The upper selectron may also be called the top select gate (TSG) or drain selectron. The lower selectron may also be called the bottom select gate (BSG) or source selectron. The gate of each TSG is connected to a drain select line (DSL), the source of each TSG is connected to the drain of the first memory cell in the string to which it belongs, and the drain of each TSG is connected to a bit line (BL). The gate of each BSG is connected to a source select line (SSL), the drain of each BSG is connected to the source of the last memory cell in the string to which it belongs, and the source of each BSG is connected to a source line (SL).

It can also be seen from FIG. 7 that the 3D NAND includes n BLs, BL0 to BLn, arranged in the direction X, x DSLs, DSL0 to DSLx, arranged in the direction Y and x SSLs: SSL0 to SSLx arranged in the direction Y. Wherein n and x are both integers greater than 1. Each DSL is connected to the gates of n TSGs arranged in the direction X, each BL is connected to the drains of x TSGs arranged in the direction Y, and each SSL is connected to the gates of n BSGs arranged in the direction X. The source of each BSG is connected to the same SL, so the SL is also called array common source (ACS). The acronym DUL stands for "dummy word lines" and refers to virtual memory cells positioned between the TSG/BSG and the word lines as shown in FIG. 7.

Continuing with reference to FIG. 7, memory cells in each string 701 share a group of word lines (WL) with memory cells in other strings 701. Assuming that each string 701 includes m memory cells, the 3D NAND may include m WLs: WL0 to WLm arranged in the direction Z, where m is an integer greater than 1. Each WL is connected to the gate of each memory cell located on the same layer (i.e., having substantially the same height with respect to the bearing surface of the substrate). Program processing of the memory cells is described below: the program processing may be realized by applying a program voltage to the gate of the memory cell, and the memory cell may enable storing in the corresponding storage state through the program processing. Continuing with reference to the structure shown in FIG. 7, when performing program processing to any memory cell, the respective TSG may be turned on by applying a voltage to the DSL corresponding to the memory cell the corresponding TSG, and the memory cell to be programmed may be further selected. For example, when the memory cell 702 in FIG. 7 is programmed, a voltage may be applied to the DSL0, and the TSG in the string 701 is also turned on.

On the other hand, the WL corresponding to the memory cell 702 may be applied with different program voltages. An on voltage (generally less than 2V) may be applied to the BL corresponding to the memory cell 702 each time the program voltage is applied to the WL so that the program voltage applied to the WL may act on the control gate of the memory cell 702. In addition, a mask voltage (typically greater than or equal to 2V) may be applied to other BLs for masking the program voltage applied to WL acting on the control gates of memory cells other than memory cell 702. In such a way, the program voltage applied to the WL each time may act on different memory cells so that different memory cells may be written in different storage states.

Figure 8:
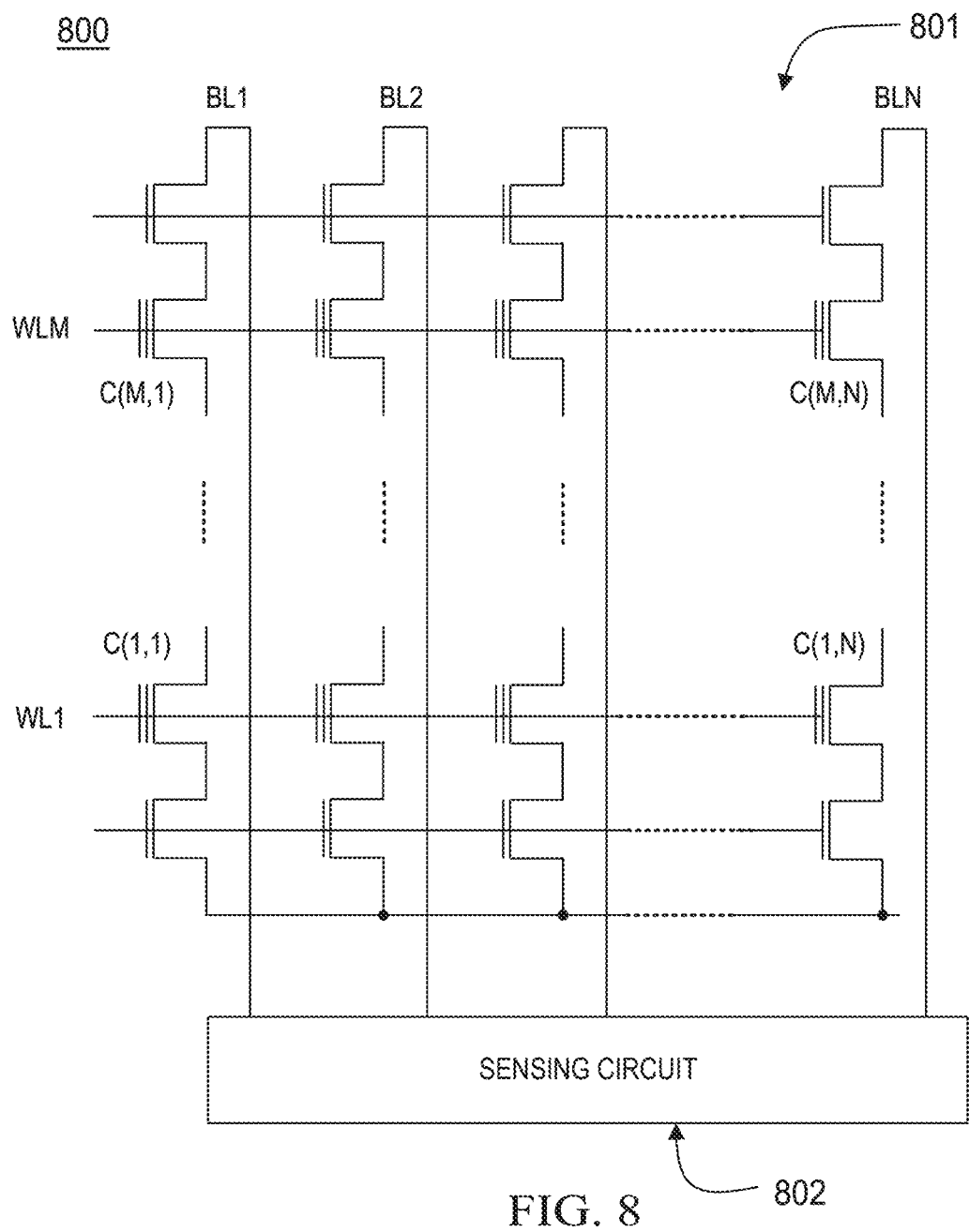
FIG. 8 is a schematic diagram of a memory device including a sensing circuit provided by an implementation of the present application.

FIG. 8 shows a schematic diagram of a memory device provided according to an implementation of the present application. The memory device 800 may include a memory cell array 801 having a plurality of memory cells C(1, 1) to C(M, N) and a sensing circuit 802, where M and N are positive integers. The memory cell array 801 may be any of the memory cell arrays in the above implementations. The sensing circuit 802 may include a plurality of sensing nodes SO (not shown in FIG. 8), each of which is coupled to bit lines BL1 to BLN of the memory cells, respectively. The sensing circuit detects a storage state or a threshold voltage of a target memory cell by sensing a voltage or a current on a selected bit line BLn.

Figure 9:
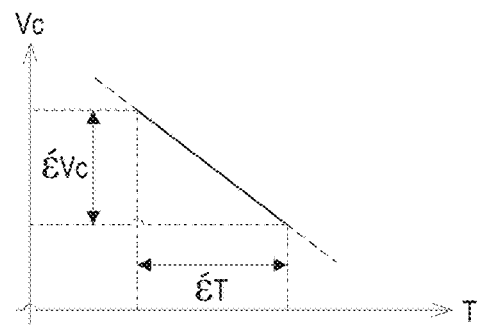
FIG. 9 is a graph of a discharge curve of a sensing node SO provided by an implementation of the present application.

FIG. 9 is a graph of a discharge curve of a sensing node SO provided by an implementation of the present application. As shown in FIG. 9, when performing a read operation, the sensing node SO is first charged to a fixed voltage. The sensing node SO is connected to the memory cell through a bit line. If the read voltage applied during the read operation enables the memory cell to be turned on, the sensing node SO may be discharged due to the turn-on of the memory cell after a period of time (default discharge duration $\Delta T$). If the read voltage applied during the read operation does not enable the memory cell to turn on or only enables the memory cell to turn on weakly, the sensing node SO may hardly discharge after a period of time ($\Delta T$). Based on this, the channel current may be indirectly measured by the voltage change $\Delta Vc$ of the sensing node SO so as to obtain the storage state of the memory cell. Usually, the read data for indicating the storage state of the memory cell is called hard data.

In one example, a page is the smallest unit for reading in memory. After a page is read each time, the fail bit count (FBC) corresponding to reading the page may be determined through a check mechanism. FBC refers to the number of memory cells in the page with errors in reading. If it is determined that the corresponding FBC is greater than a preset value after reading the page, hard decoding of the page may be triggered, which may be called default-read hard decoding. If the hard decoding of the page is successful, it means that the storage state of the memory cells in the page with errors in the reading may be successfully decoded; that is, the hard data of each memory cell may be successfully read. If the hard decoding of the page fails, it means that the storage state of the memory cells in the page with errors in reading cannot be successfully decoded, and then the best-read hard decoding of the page may be further triggered.

The best-read hard decoding refers to the process in which the read voltage of each storage state is adjusted to the best-read voltage, and the storage state of each memory cell in the page is read again, and then the page is hard decoded based on the read result. Reading the storage state of each memory cell in the page again after the read voltage of each storage state is adjusted to the best-read voltage may reduce the value of FBC to a certain extent. Hard decoding the page at this moment may improve the success rate of hard decoding. If the best-read hard decoding of the page is successful, it means that the storage state of the memory cells in the page with errors in reading can be successfully decoded; that is, the hard data of each memory cell can be successfully read. If the best-read hard decoding of the page fails, it means that the storage state of the memory cells in the page with errors in reading cannot be successfully decoded, and then the best-read soft decoding of the page may be further triggered.

The best-read soft decoding refers to the process in which the soft data of the page is read through the soft read voltage, and then the soft decoding is performed according to the soft data and hard data of the page. The soft data is data indicating the position of the threshold voltage of the memory cell in the threshold voltage distribution where the memory cell is located. The soft data may provide additional reliability information for the above-described hard data. The value of the soft data indicates the proximity of the threshold voltage of the memory cell relative to the read voltage corresponding to the above-described hard data. The soft read voltage corresponding to each storage state may include a first soft read voltage less than the best-read voltage corresponding to the storage state and a second soft read voltage greater than the best-read voltage corresponding to the storage state. If the best-read soft decoding of the page is successful, it means that the storage state of the memory cell in the page with errors in reading can be successfully decoded; that is, the hard data of each memory cell can be successfully read. If the best-read soft decoding of the page fails, it means that the storage state of the memory cell in the page with errors in reading cannot be successfully decoded; that is, the page failed to be read.

Figure 10:
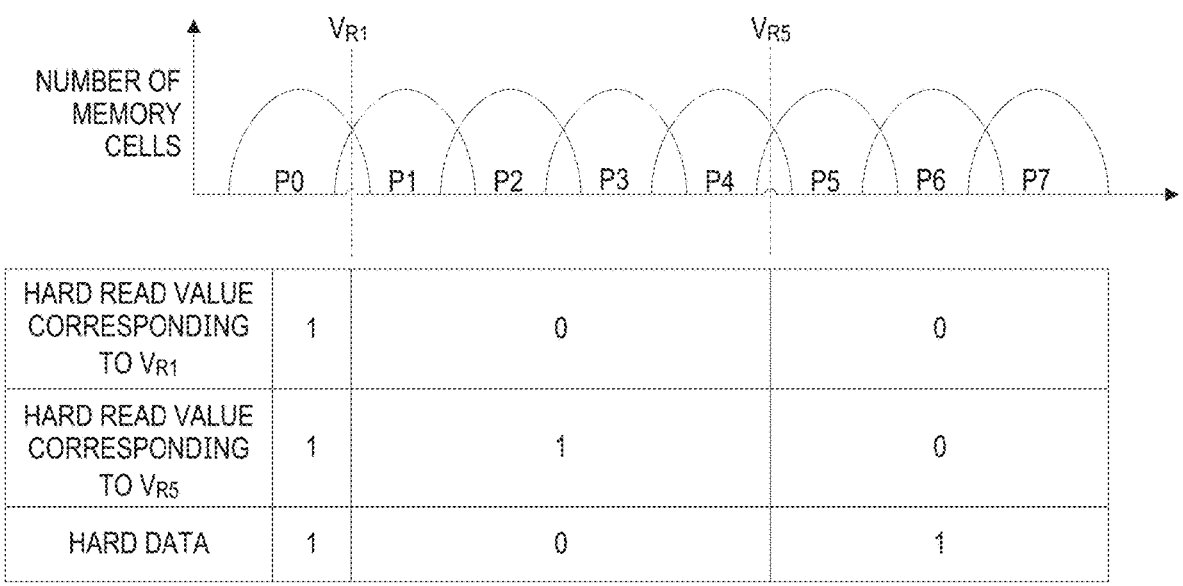
FIG. 10 is a graph and table depicting the process of reading hard data provided by an implementation of the present application.

The processes for reading hard data and soft data are described below in conjunction with FIG. 10 and FIG. 11. FIG. 10 is a graph and table depicting a process for reading hard data provided by the implementation of the present application. As shown in FIG. 10, taking the triple-level memory cells as an example, each memory cell may be configured to store 3 bits of data in one of 8 storage states (P0-P7 states). In the triple-level memory cell, each physical page corresponds to three logical pages, namely, a low page (LP), a middle page (MP), and an up page (UP). For example, when a memory cell is read to read hard data on the low page, a read voltage $V_{R1}$ is applied first to the word line where the memory cell is located. The read voltage $V_{R1}$ may distinguish the P0 state from the P1-P7 states. The hard read value corresponding to $V_{R1}$ is obtained by detecting the potential of the sensing node SO after discharge. In some implementations, the hard read value of memory cells with a threshold voltage less than the read voltage $V_{R1}$ may be 1, and the hard read value of memory cells with a threshold voltage greater than the read voltage $V_{R1}$ may be 0. In other implementations, the hard read value of the memory cells with a threshold voltage greater than the read voltage $V_{R1}$ may be 1, and the hard read value of the memory cells with a threshold voltage less than the read voltage $V_{R1}$ may be 0. This is not limited to the implementations of the present application.

Then, a read voltage VRs is applied to the word line where the memory cell is located. The read voltage VRs may distinguish the P0-P4 states from the P5-P7 states. The hard read value corresponding to VRs is obtained by detecting the discharge of the sensing node SO. In some implementations, the hard read value of memory cells with a threshold voltage less than the read voltage $V_{R5}$ may be 1, and the hard read value of memory cells with a threshold voltage greater than the read voltage VRs may be 0. At last, the hard read value corresponding to the read voltage $V_{R5}$ is inverted and then OR-ed with the hard read value corresponding to the read voltage $V_{R1}$ to obtain the hard data corresponding to the low page.

Figure 11:
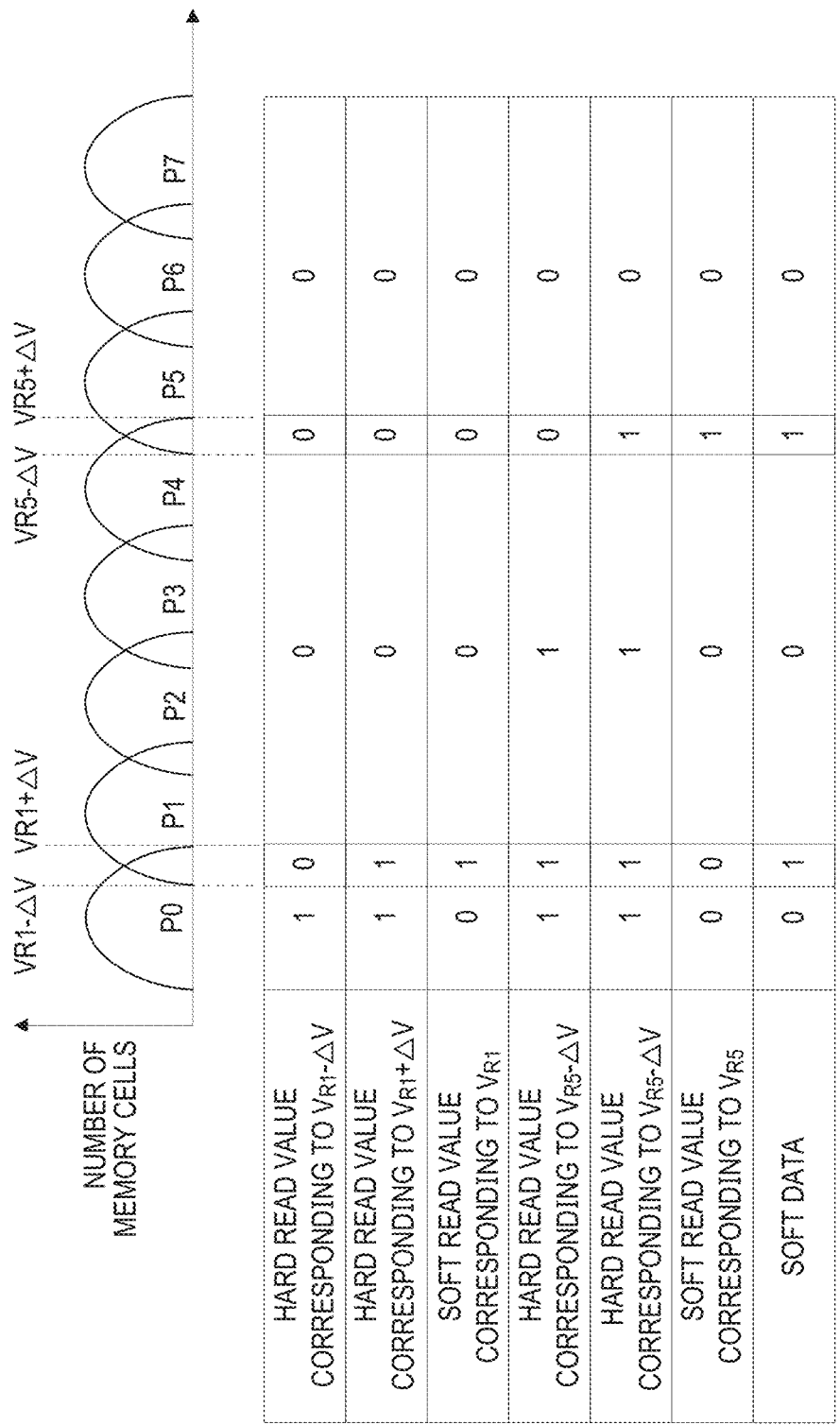
FIG. 11 is a graph and table depicting the process of reading soft data provided by the implementation of the present application.

FIG. 11 is a graph and table depicting a process for reading soft data provided by the implementation of the present application. As shown in FIG. 11, taking reading the soft data of the low page in the TLC as an example, a read voltage $V_{R1}-\Delta V$ is applied first to the word line where the memory cell to be read is located to obtain the soft read value corresponding to the read voltage $V_{R1}-\Delta V$. The value of $\Delta V$ may be determined based on the threshold voltage distribution of each storage state in the TLC. When the threshold voltage of the memory cell is less than the read voltage $V_{R1}-\Delta V$, the soft read value corresponding to $V_{R1}-\Delta V$ is 1, while when the threshold voltage of the memory cell is greater than the read voltage $V_{R1}-\Delta V$, the soft read value corresponding to $V_{R1}-\Delta V$ is 0. Then, the read voltage $V_{R1}+\Delta V$ is applied to the word line where the memory cell is located to obtain the soft read value corresponding to the read voltage $V_{R1}+\Delta V$. When the threshold voltage of the memory cell is less than the read voltage $V_{R1}+\Delta V$, the soft read value corresponding to $V_{R1}+\Delta V$ is 1, while when the threshold voltage of the memory cell is greater than the read voltage $V_{R1}+\Delta V$, the soft read value corresponding to $V_{R1}+\Delta V$ is 0. The soft read value corresponding to the read voltage $V_{R1}-\Delta V$ and the soft read value corresponding to the read voltage $V_{R1}+\Delta V$ are XOR-ed to obtain the soft read value corresponding to $V_{R1}$. When the threshold voltage of the memory cell is greater than $V_{R1}-\Delta V$ and less than $V_{R1}+\Delta V$, the soft read value corresponding to $V_{R1}$ is 1, while the threshold voltage of the memory cell is greater than $V_{R1}+\Delta V$ or less than $V_{R1}-\Delta V$, the soft read value corresponding to $V_{R1}$ is 0.

Then, the read voltage VRs-AV and the read voltage $V_{R5}+\Delta V$ are applied to the word line where the memory cell to be read is located, respectively, to obtain the soft read value corresponding to VRs. It should be understood that the way of obtaining the soft read value corresponding to $V_{R5}$ is similar to that of obtaining the soft read value corresponding to $V_{R1}$ described above and, therefore, will not be repeated in detail. Finally, the soft read value corresponding to $V_{R1}$ and the soft read value corresponding to $V_{R5}$ is OR-ed to obtain the soft data of the low page.

As the processing technology of memory devices (for example, 3D NAND) advances, the number of stacked layers increases, and the distance between the layers decreases, which leads to more and more obvious interlayer interference between adjacent layers of 3D NAND.

Interlayer interference refers to the situation in which an edge electric field generated by the program voltage applied on the memory cell when programming the memory cells in any layer of the 3D NAND flash memory chip may cause the number of electrons stored in the programmed memory cells in the adjacent layers to be influenced (generally increasing the number of electrons stored in the memory cells), and the influence is especially more obvious for the memory cells in the adjacent layers and corresponding to the same string. The change in the number of electrons stored in the programmed memory cell may result in a change in the threshold voltage so as to increase the probability that errors occur in reading the memory cell.

Figure 12:
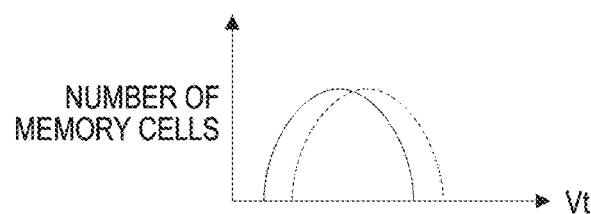
FIG. 12 is a graph of a threshold voltage distribution of a memory cell provided by an implementation of the present application.

The applicant, when solving the influence of interlayer interference on the memory cells, finds that interlayer interference has the following features:

Feature 1: the larger the program voltage applied to the memory cell, the greater the influence of the edge electric field on the programmed memory cells in the adjacent layer. FIG. 12 is a graph of the threshold voltage distribution of memory cells in a certain storage state after being influenced by interlayer interference. In FIG. 12, the dotted curve is the threshold voltage distribution of the first memory cell of the memory cells in a certain storage state, and the solid curve is the threshold voltage distribution of the second memory cell of the memory cells in a certain storage state. The influence on the first memory cell by the interlayer interference is relatively high, i.e., the storage state of the memory cells adjacent to the first memory cell and located in the same string is higher, while the influence on the second memory cell by the interlayer interference is relatively low, i.e., the storage state of the memory cells adjacent to the second memory cell and located in the same string is lower. The storage state of the memory cell being high means that the memory cell has a higher threshold voltage, and it needs a higher program voltage to program the memory cell to a corresponding storage state. The storage state of the memory cell being low means that the memory cell has a lower threshold voltage, and it needs a lower program voltage to program the memory cell to a corresponding storage state. Whether the storage state is high or low may be divided by a technician without limitation in the implementations of the present application. For example, in a TLC memory cell, the storage states P0-P3 are lower storage states, and the storage states P4-P7 are higher storage states, wherein the threshold voltages of the storage states P0-P7 increase in turn. It can be seen from FIG. 12 that the influence on the first memory cell by the interlayer interference is relatively high, and the threshold voltage increment of the first memory cell is greater than that of the second memory cell.

Figure 13:
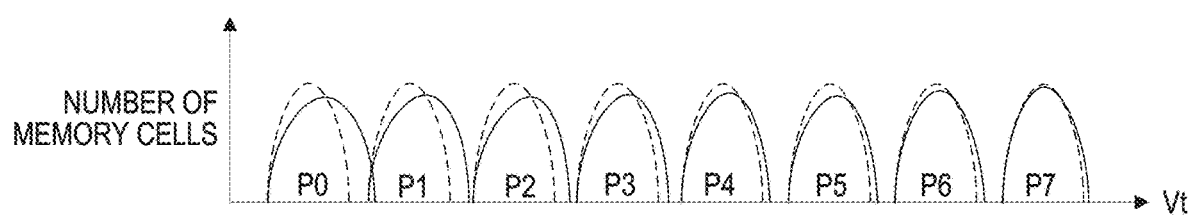
FIG. 13 is a graph of a threshold voltage distribution of a triple-level memory cell provided by an implementation of the present application.

Feature 2: The smaller the threshold voltage of the programmed memory cell (i.e., the smaller the number of electrons in the memory cell), the greater the influence of the edge electric field generated by the program voltage applied to the memory cell in the adjacent layer. FIG. 13 is a graph of the threshold voltage distribution of memory cells in different storage states after being influenced by interlayer interference. In FIG. 13, the dotted curve is the threshold voltage distribution of each storage state without interlayer interference, and the solid curve is the threshold voltage distribution of each storage state with interlayer interference. It can be seen from FIG. 13 that, for the memory cell in a lower storage state, the corresponding threshold voltage increment after the memory cell is influenced by interlayer interference is larger. FIG. 13 is only a schematic illustration of the threshold voltage distribution before and after each storage state of the triple-level memory cell being influenced by the interlayer interference. For other types of memory cells, the rule of the threshold voltage distribution before and after being influenced by the interlayer interference is similar to that of FIG. 13 and may not be repeated in the implementations of the present application.

In order to avoid the problem of errors in reading memory cells caused by interlayer interference, the present application provides a method for operating a memory. With this method, the threshold voltage of the target memory cell may be compensated by adjusting the discharge duration of the sensing node, and then the influence on the memory cell by interlayer interference may be reduced. The following is a description of the principle of a method for operating the memory:

Case 1: while reading the memory cell of any storage state, after the read voltage corresponding to the storage state is applied to the memory cell, if the discharge duration of the corresponding sensing node SO is shortened, the voltage of the sensing node SO after discharging is higher than that when the discharge duration of the sensing node SO is not shortened.

Assuming that the threshold voltage of the programmed memory cell is increased by some means, the storage state of the memory cell is not changed. After the read voltage corresponding to the storage state is applied to the memory cell, the on resistance generated by the memory cell may increase due to the increased threshold voltage, thus causing the discharge current of the sensing node SO to decrease. In this way, after the default discharge duration, the voltage of the sensing node SO may be increased compared to the case where the threshold voltage is not increased.

Case 2: while reading the memory cell of any storage state, after the read voltage corresponding to the storage state is applied to the memory cell, if the discharge duration of the corresponding sensing node SO is prolonged, the voltage of the sensing node SO after discharging is lower than that when the discharge duration of the sensing node SO is not prolonged.

Assuming that the threshold voltage of the programmed memory cell is decreased by some means, the storage state of the memory cell is not changed. After the read voltage corresponding to the storage state is applied to the memory cell, the on resistance generated by the memory cell may decrease due to the decreased threshold voltage, thus causing the discharge current of the sensing node SO to increase. In this way, after the default discharge duration, the voltage of the sensing node SO may be decreased compared to the case where the threshold voltage is not decreased.

It can be seen from the above two cases that shortening the discharge duration of the sensing node SO is equivalent to increasing the threshold voltage of the memory cell, which may increase the voltage of the sensing node SO after discharging and prolonging the discharge duration of the sensing node SO is equivalent to decreasing the threshold voltage of the memory cell, which may decrease the voltage of the sensing node SO after discharging.

Therefore, in the implementations of the present application, the effect of adjusting the threshold voltage of the memory cell may be enabled by adjusting the discharge duration of the sensing node SO, and the influence of interlayer interference on the threshold voltage of the memory cell may be reduced.

Figure 14:
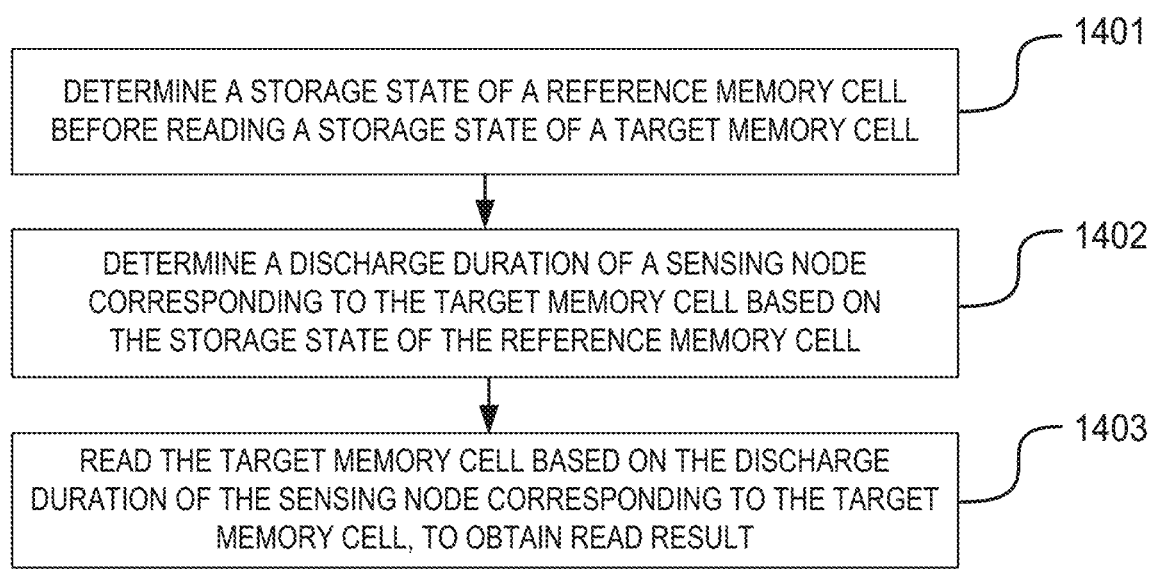
FIG. 14 is a flowchart of a method for operating a memory provided by an implementation of the present application.

FIG. 14 is a flowchart of a method for operating a memory provided by implementations of the present application. The memory may be any memory device in the above implementations. The method for operating the memory provided by the implementation of the present application is described below in conjunction with FIG. 14. With reference to FIG. 14, the method comprises:

Step 1401: Determine a storage state of a reference memory cell before reading the storage state of a target memory cell.

The storage state of the reference memory cell may be determined before reading the storage state of the target memory cell. In an implementation of the present application, the target memory cell may be each memory cell included in a page to be read in the memory. The target memory cell and the reference memory cell are located in a same string and adjacent, and the programming order of the reference memory cell is after that of the target memory cell. That is, in the programming of the memory, the programming order of the reference memory cell is before the target memory cell, and the edge electric field generated by the program voltage applied to the reference memory cell may influence the threshold voltage of the target memory cell.

In step 1401, the storage state of the reference memory cell may be obtained by reading the reference memory cell. For example, the storage state of the reference memory cell may be obtained by reading in a traditional way; that is, the storage state of the reference memory cell may be read according to the default discharge duration of the sensing node. After the storage state of the memory cell is read, the read result may be stored through a latch.

For example, when reading each memory cell in the first page coupled to WLn, the storage state of each memory cell in the second page coupled to WLn+1 may be read first. The programming order of WLn+1 is before WLn. The memory cell in the first page and the memory cell in the second page belong to the same string. The memory cell in the first page is the target memory cell, and the memory cell in the second page is the reference memory cell.

Step 1402: Determine the discharge duration of the sensing node corresponding to the target memory cell based on the storage state of the reference memory cell.

Referring to FIG. 12, the higher the storage state of the reference memory cell is, the higher the program voltage applied when programming the reference memory cell, the greater the influence of the interlayer interference on the target memory cell, and the greater the increment of the threshold voltage of the target memory cell caused by the interlayer interference may be. Therefore, the storage state of the reference memory cell may reflect the increment of the threshold voltage of the target memory cell caused by the interlayer interference. Therefore, in this step, the discharge duration of the sensing node corresponding to the target memory cell may be determined according to the storage state of the reference memory cell. Then, the threshold voltage of the target memory cell may be compensated by adjusting the discharge duration of the sensing node so as to reduce the influence of the interlayer interference on the target memory cell.

In an implementation, the memory controller may store the correspondence between the storage state of the reference memory cell and the discharge duration. After determining the storage state of each reference memory cell, the discharge duration of the sensing node corresponding to each target memory cell in reading each target memory cell may be determined according to the correspondence.

For example, in the correspondence, the higher the storage state of the reference memory cell is, the longer the corresponding discharge duration may be, and the corresponding discharge duration of each storage state may be larger than the default discharge duration. In this way, increasing the discharge duration of the sensing node SO is equivalent to reducing the threshold voltage of the target memory cell, which is equivalent to canceling the increment of the threshold voltage of the target memory cell caused by interlayer interference. It should be noted that the specific discharge duration corresponding to each storage state may be set by a technician; for example, based on the experimental data, the specific value of the discharge duration is not limited in the implementation of the present application. For example, since adjusting the discharge duration of the sensing node SO is equivalent to adjusting the threshold voltage of the target memory cell, the read voltage of each storage state may be adjusted adaptively in reading the target memory cell to improve the accuracy of reading the target memory cell.

In another implementation, the storage state range in which the storage state of the reference memory cell is located may be determined. According to the storage state range of the reference memory cell, the discharge duration of the sensing node corresponding to the target memory cell may be determined.

The interlayer interference produced by reference memory cells in the same storage state range during programming has a close influence on target memory cells so that the target memory cells corresponding to reference memory cells in the same storage state range may be compensated by the same discharge duration. The number of storage state ranges into which each storage state is divided, and the number of storage states included in each storage state range may be set in advance by a technician, which is not limited to the implementations of the present application. For example, the storage states of the triple-level memory cells may include P0-P7 states, wherein P0-P2 states may belong to the same storage state range, P3-P5 states may belong to the same storage state range, and P6-P7 states may belong to the same storage state range.

In an example, the storage state range may be divided into a first storage state range and a second storage state range, wherein storage states in the first storage state range are lower than storage states in the second storage state range. For example, for the triple-level memory cells, P0-P3 states may belong to the first storage state range, and P4-P7 states may belong to the second storage state range.

The discharge duration corresponding to the first storage state range may be less than a default discharge duration of the sensing node, and the discharge duration corresponding to the second storage state range may be greater than the default discharge duration of the sensing node.

Figure 15:
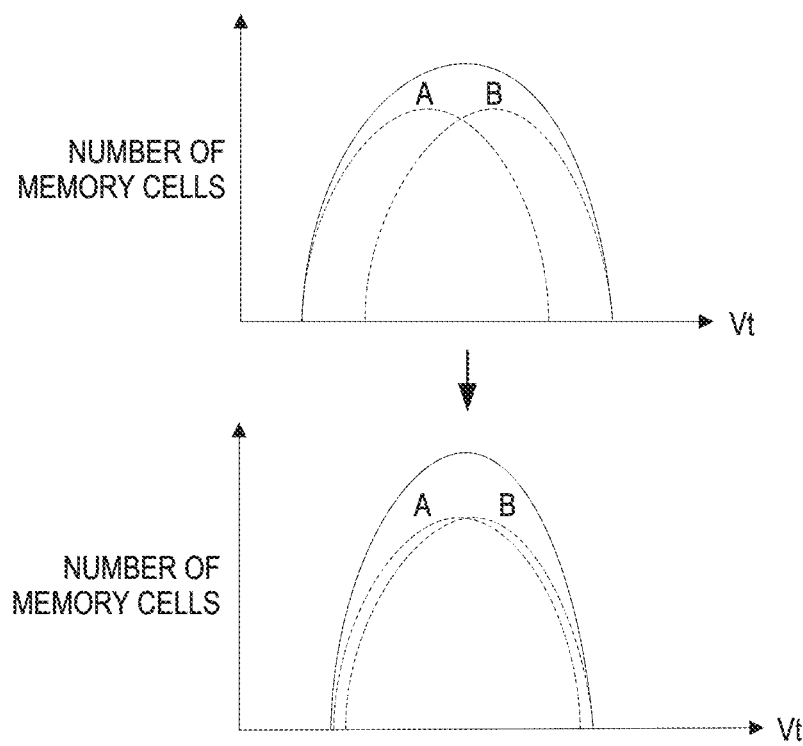
FIG. 15 depicts two graphs of a threshold voltage distribution of a memory cell provided by an implementation of the present application.

Referring to FIG. 12, since the storage state in the first storage state range is relatively low, the reference memory cell belonging to the first storage state range has less influence on the threshold voltage of the target memory cell when programming. Since the storage state in the second storage state range is relatively high, the reference memory cell belonging to the second storage state range has more influence on the threshold voltage of the target memory cell during programming. As shown in FIG. 15, the dashed line A indicates the threshold voltage distribution of a memory cell in a certain storage state influenced by a memory cell in the first storage state range, and the dashed line B indicates the threshold voltage distribution of a memory cell in the same storage state influenced by a memory cell in a second storage state range. As can be seen from FIG. 15, the threshold voltage distribution of the memory cell influenced by the programming of the memory cell in the first storage state range is relatively near the front; that is, the increment of the threshold voltage of the memory cell influenced by the interlayer interference is relatively small. The threshold voltage distribution of the memory cell influenced by the programming of the memory cell in the second storage state range is relatively near the end; that is, the increment of the threshold voltage of the memory cell influenced by the interlayer interference is relatively large.

Thus, in the implementations of the present application, shortening the discharge duration corresponding to the first storage state range to be less than the default discharge duration is equivalent to further increasing the threshold voltage of the target memory cell. From the effect, it is equivalent to moving the dotted line A in FIG. 15 backward as a whole. Prolonging the discharge duration corresponding to the second storage state range to be larger than the default discharge duration is equivalent to decreasing the threshold voltage of the target memory cell. From the effect, it is equivalent to moving the dotted line B in FIG. 15 forward as a whole. It can be seen that for the target memory cell of each storage state, the effect may be that the dash lines A and B are brought to the middle in FIG. 15 by setting the discharge duration corresponding to the first storage state range and the second storage state range in the above way so that the threshold voltage distribution of each storage state is narrowed. Thus, the degree of coincidence among the threshold voltage distributions of each storage state may be reduced, and the margin may be increased; thereby, the accuracy of reading the target memory cell may be improved.

In an example, the discharge duration includes the discharge duration for verifying each storage state. The higher the storage state being verified, the smaller the absolute value of the difference between the corresponding discharge duration and the default discharge duration.

Referring to FIG. 13, the memory cells having different storage states are differently influenced by interlayer interference. Therefore, while reading the target memory cell, in reading each storage state, the duration of the sensing node may be adjusted with reference to feature 2 of interlayer interference. In the implementations of the present application, in view of the fact that the discharge duration corresponding to the first storage state range is smaller than the default discharge duration of the sensing node and the discharge duration corresponding to the second storage state range is larger than the default discharge duration of the sensing node, the higher the storage state being verified, the smaller the absolute value of the difference between the corresponding discharge duration and the default discharge duration. Taking the triple-level memory cell as the target memory cell as an example, the corresponding discharge duration of the sensing node while reading each storage state of the target memory cell may be shown in the following Table 1:

TABLE 1

| WLn read level | Group 1 | Group 2 |
| --- | --- | --- |
| R1 | T_sodev_r1_grp1 | T_sodev_r1_grp2 |
| R2 | T_sodev_r2_grp1 | T_sodev_r2_grp2 |
| R3 | T_sodev_r3_grp1 | T_sodev_r3_grp2 |
| R4 | T_sodev_r4_grp1 | T_sodev_r4_grp2 |
| R5 | T_sodev_r5_grp1 | T_sodev_r5_grp2 |
| R6 | T_sodev_r6_grp1 | T_sodev_r6_grp2 |
| R7 | T_sodev_r7_grp1 | T_sodev_r7_grp2 |

Where R1 to R7 are read voltages corresponding to different storage states, Group 1 is the first storage state range, and Group 2 is the second storage state range. T_sodev_r1_grp1 to T_sodev_r7_grp1, respectively, indicate the duration of sensing node SO of the target memory cell corresponding to the first storage state range when R1-R7 is applied. T_sodev_r1_grp1 to T_sodev_r7_grp1 are less than the default discharge duration and increased in turn. T_sodev_r1_grp2 to T_sodev_r7_grp2, respectively, indicate the duration of sensing node SO of the target memory cell corresponding to the second storage state range when R1-R7 is applied. T_sodev_r1_grp2 to T_sodev_r2_grp1 are larger than the default discharge duration and shortened in turn.

For the target memory cell corresponding to the reference memory cell belonging to the first storage state range, the duration of the corresponding sensing node needs to be shortened. This is because the higher the storage state of the target memory cell, the smaller the influence of the interlayer interference, and the smaller the increment of the threshold voltage. Therefore, the higher the storage state of the target memory cell, the less the amount of the threshold voltage needs to be compensated, and therefore, the discharge duration of the sensing node SO may be closer to the default discharge duration.

Likewise, for the target memory cell corresponding to the reference memory cell belonging to the second storage state range, the duration of the corresponding sensing node needs to be prolonged. This is because the higher the storage state of the target memory cell, the smaller the influence of the interlayer interference is, and the smaller the increment of the threshold voltage is. Therefore, the higher the storage state of the target memory cell, the less the amount of the threshold voltage needs to be compensated, and therefore, the discharge duration of the sensing node SO may be closer to the default discharge duration.

It can be seen that in the implementations of the present application, by further adjusting the discharge duration of the sensing node SO when reading the storage state according to the read storage state of the target memory cell being read, the influence on the target memory cell by the interlayer interference may be further and accurately reduced, and the accuracy of reading the target memory cell may be improved.

Step 1403: Read the target memory cell based on the discharge duration of the sensing node corresponding to the target memory cell to obtain read results.

After the discharge duration of the sensing node corresponding to the target memory cell is determined according to the storage state of the reference memory cell, the storage state of the target memory cell may be read based on the determined discharge duration to obtain the read result.

The method for operating the memory provided by the implementations of the present application may be applied in each reading process for the memory so that the accuracy of reading may be improved. Especially in some scenes with higher safety requirements, such as automatic driving, aerospace, and the like, the application of the implementations of the present application may improve the stability of the equipment in the corresponding scenes to a certain extent and improve the safety of the equipment application.

The implementations of the present application also provide another idea of the method for operating the memory. That is, the method for operating the memory provided by the implementations of the present application is applied after the read processing on the memory is carried out with a traditional method and the reading fails.

It can be seen from FIGS. 10 and 11 that the traditional reading method includes: after reading the page where the target memory cell is located, a default-read hard decoding is performed if it is determined that FBC is greater than a first preset value, and a best-read hard decoding is performed if the default-read hard decoding fails, and then a best-read soft decoding is performed if the best-read hard decoding fails. In the implementations of this application, the target memory cell may be read by combining hard decoding failure and/or soft decoding. The following are several application schemes provided according to the implementations of the present application:

Solution 1: The page where the target memory cell is located is read. In response to the fail bit count (FBC) of the page being greater than the first preset value, the default-read hard decoding is performed. In response to a default-read hard decoding failure, the storage state of the reference memory cell is determined.

In Solution 1, the memory may read the page where the target memory cell is located according to the traditional reading method. If the default-read hard decoding is triggered during reading and it is determined that the performing of the default-read hard decoding fails, the page where the target memory cell is located may be read again with the operating method provided in this application. In most cases, with Solution 1, the memory may read the target memory cell according to the traditional reading method and only read the target memory cell with the method of the present application if the default-read hard decoding is triggered and the decoding fails. In this way, it is not necessary to read the storage state of the reference memory cell first before reading the target memory cell every time, which does not reduce the reading efficiency of the memory.

Figure 16:
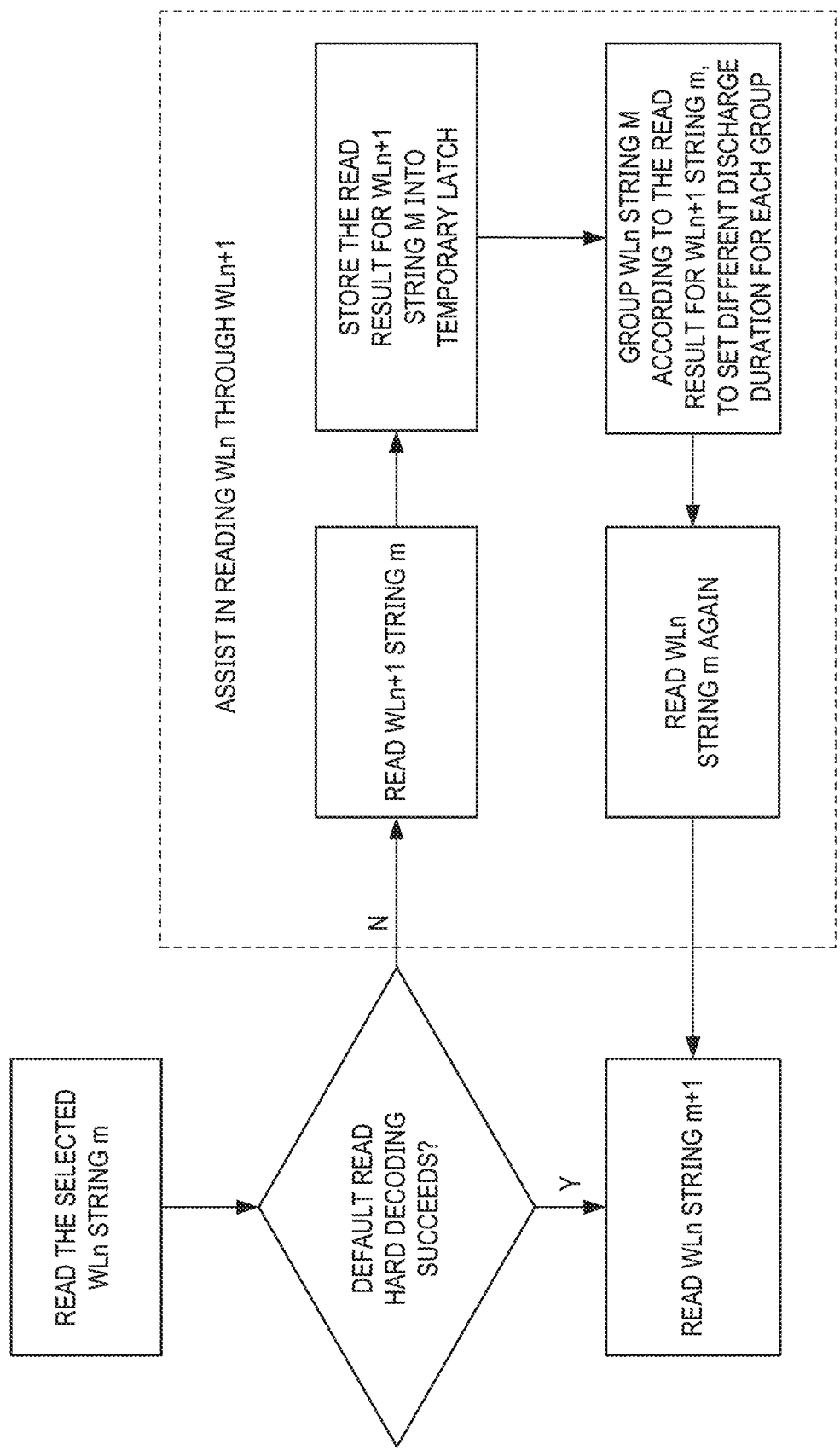
FIG. 16 is a flowchart of a method for operating a memory provided by an implementation of the present application.

As shown in FIG. 16, the memory triggers the default-read hard decoding after reading the selected WLn string m. If it is determined that the hard decoding succeeds, WLn string m+1 may be further read. If it is determined that the hard decoding fails, the solution of the present application to assist in reading WLn through WLn+1 may be triggered. That is, WLn+1 string m is read first, and the read result is stored in a temporary latch. After WLn+1 string m is read, the memory cells corresponding to WLn string m may be grouped according to the read results of WLn+1 string m, and then different discharge durations may be set for each group of memory cells. In an example, in order to improve grouping efficiency, SLC read may be performed on WLn+1 string m, so that the memory cells of WLn string m may be divided into two groups with WLn+1 string m being read only once. After the memory cells of WLn string m are grouped, WLn string m may be read again according to the discharge duration corresponding to each group of memory cells. If the reading is successful, WLn string m+1 may be further read.

It should be noted that string m and string m+1 refer to the strings generated after the memory region is divided by the top select gate cut (TSG-CUT). The memory array is divided into a plurality of blocks by the first gate isolation structure, the blocks are divided into two or more fingers by the second gate isolation structure, and the memory region is divided by the TSG-CUT into two or more strings.

In addition, if the default-read hard decoding is triggered again when the target memory cell is read with the operating method provided by the present application, since the operating method provided by this application can solve the influence of interlayer interference, the corresponding FBC may be reduced when the default-read hard decoding is triggered again. Thus, the probability of performing default-read hard decoding again being successful may be increased.

Solution 2: performing a best-read hard decoding in response to performing the default-read hard decoding failure; determining the storage state of the reference memory cell in response to performing of the best-read hard decoding failure; and reading the target memory cell based on the discharge duration of the sensing node corresponding to the target memory cell and a best-read voltage.

In Solution 2, the memory may read the page where the target memory cell is located according to the traditional reading method. If the best-read hard decoding is triggered during reading and the hard decoding fails, the best-read hard decoding is performed again with the operating method provided in the present application being combined with the best-read hard decoding. It can be seen from the above contents of FIGS. 10 and 11 that, the best-read hard decoding refers to the process wherein the read voltage of each storage state is adjusted to the best-read voltage, and the storage state in each memory cell in this page is read again, and then the page is hard decoded according to the read result. Therefore, in Solution 2, when the best-read hard decoding is triggered during the reading of the page where the target memory cell is located, and the hard decoding fails, the corresponding discharge duration of each target memory cell in the page may be determined first according to the storage state of the reference memory cell. The page may be read according to the best-read voltage, and the sensing node SO of each target memory cell is discharged according to a determined discharge duration during the reading. Therefore, the influence of interlayer interference when the page is read according to the best-read voltage is reduced, and the success rate of performing the best-read hard decoding again may be increased.

Figure 17:
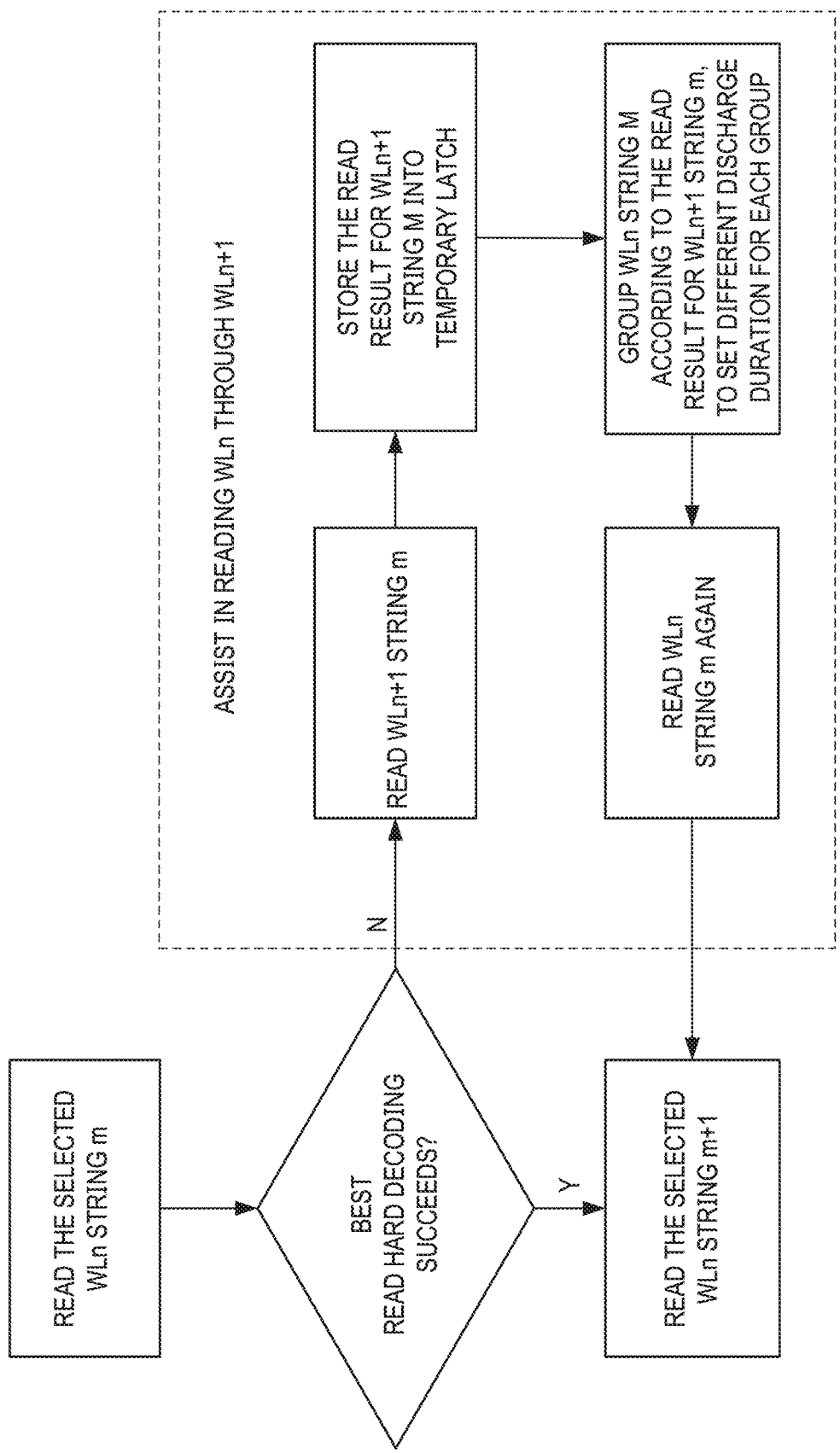
FIG. 17 is a flowchart of a method for operating a memory provided by an implementation of the present application.

As shown in FIG. 17, the memory triggers the best-read hard decoding after reading the selected WLn string m. If it is determined that the hard decoding succeeds, WLn string m+1 may be further read. If it is determined that the hard decoding fails, the solution of the present application to assist in reading WLn through WLn+1 may be triggered. That is, WLn+1 string m is read first, and the read result is stored in a temporary latch. After WLn+1 string m is read, the memory cells corresponding to WLn string m may be grouped according to the read result of WLn+1 string m, and then different discharge durations may be set for each group of memory cells. In an example, in order to improve grouping efficiency, SLC read may be performed on WLn+1 string m, so that the memory cells of WLn string m may be divided into two groups with WLn+1 string m being read only once. After the memory cells of WLn string m are grouped, WLn string m may be read again according to the discharge duration corresponding to each group of memory cells. If the reading succeeds, WLn string m+1 may be further read.

Solution 3: performing the best-read hard decoding in response to performing the default-read hard decoding failure; performing the best-read soft decoding in response to performing of the best-read hard decoding failure; and determining the storage state of the reference memory cell in response to performing of the best-read soft decoding failure.

In Solution 3, the memory may read the page where the target memory cell is located according to the traditional reading method. If the best-read soft decoding is triggered during reading and the hard decoding fails, the operating method provided by the present application may be combined with the best-read soft decoding. It can be seen from the above contents of FIGS. 10 and 11 that the best-read soft decoding refers to the process of the soft data in the page being read by the soft read voltage and performing the soft decoding according to the soft data and hard data of the page. Therefore, in Solution 3, when the best-read soft decoding is triggered during the reading of the page where the target memory cell is located, and the soft decoding fails, the corresponding discharge duration of each target memory cell in the page may be determined first according to the storage state of the reference memory cell. Then, the soft data of the target memory cell in the page may be read according to the best-read voltage, the fits soft read voltage, and the second soft read voltage. Each sensing node SO of the target memory cell is discharged according to the determined discharge duration during reading. Thus, the influence of interlayer interference when the page is read according to the best-read voltage may be reduced, the accuracy of reading the soft data of the target memory cell is improved, and the success rate of the soft decoding according to the soft data and hard data of the target memory cell may be improved.

In one example, the hard data corresponding to the target memory cell may be read by a traditional reading method. That is, in Solution 3, the default-read hard decoding, the best-read hard decoding, and the best-read soft decoding are triggered successively during the reading of the target memory cell. When soft decoding is performed again in conjunction with the operating method provided by the present application, the hard data required for soft decoding may be read in the previous best-read hard decoding stage. In another example, the hard data corresponding to the target memory cell is obtained by reading the target memory cell based on the discharge duration of the sensing node corresponding to the target memory cell and the best-read voltage. That is, in solution 3, the default-read hard decoding, the best-read hard decoding, and the best-read soft decoding are triggered successively during the reading of the target memory cell. The best-read hard decoding stage may be combined with the way of the above solution 2; thus, the hard data of the target memory cell may be obtained by reading the target memory cell according to the discharge duration of the sensing node corresponding to the target memory cell and the best-read voltage. In this way, when the best-read soft decoding is performed again in solution 3, both the soft data and the hard data are obtained by reading based on the adjusted discharge duration so that the success rate of the soft decoding may be improved.

A memory is also provided in the implementations of this application. The memory may be the memory device of the above implementations. The memory may comprise: a memory cell array comprising a plurality of strings, wherein the strings comprise a plurality of memory cells; a peripheral circuit coupled to the memory cell array and configured to: determine a storage state of a reference memory cell; determine a discharge duration of a sensing node corresponding to a target memory cell based on the storage state of the reference memory cell; and read the target memory cell based on the discharge duration of the sensing node corresponding to the target memory cell, to obtain read result; wherein the target memory cell and the reference memory cell are located in a same string and are adjacent, and programming order of the reference memory cell is after that of the target memory cell.

Optionally, the peripheral circuit may be configured to: determine a storage state range in which the storage state of the reference memory cell is located, wherein the storage state range includes a first storage state range and a second storage state range, and storage states in the first storage state range are lower than storage states in the second storage state range; and determine the discharge duration of the sensing node corresponding to the target memory cell according to the storage state range of the reference memory cell.

Optionally, a discharge duration corresponding to the first storage state range may be smaller than a default discharge duration of the sensing node, and a discharge duration corresponding to the second storage state range is larger than the default discharge duration of the sensing node.

Optionally, the peripheral circuit may be configured to: read the reference memory cell based on a default discharge duration of the sensing node to obtain the storage state of the reference memory cell.

Optionally, the peripheral circuit may be further configured to: read a page where the target memory cell is located; perform a default-read hard decoding in response to a fail bit count (FBC) of the page being greater than a first preset value; and determine the storage state of the reference memory cell in response to the default-read hard decoding failure.

Optionally, the peripheral circuit may be further configured to: perform a best-read hard decoding in response to the default-read hard decoding fails; determine the storage state of the reference memory cell in response to performing of the best-read hard decoding fails; and read the target memory cell based on the discharge duration of the sensing node corresponding to the target memory cell and a best-read voltage.

Optionally, the peripheral circuit may be further configured to: perform a best-read hard decoding in response to the default-read hard decoding failure; perform a best-read soft decoding in response to the best-read hard decoding failure; and determine the storage state of the reference memory cell in response to the best-read soft decoding failure.

Optionally, the peripheral circuit may be further configured to: read the target memory cell based on the discharge duration of the sensing node corresponding to the target memory cell, a first soft read voltage less than a best-read voltage and a second soft read voltage larger than the best-read voltage, to obtain soft data corresponding to the target memory cell; and determine the read result corresponding to the target memory cell based on the soft data and hard data corresponding to the target memory cell, wherein the hard data corresponding to the target memory cell is obtained by reading the target memory cell based on the best-read voltage.

Optionally, the hard data corresponding to the target memory cell may be obtained by reading the target memory cell based on the discharge duration of the sensing node corresponding to the target memory cell and the best-read voltage.

The description of the implementations of the memory device is similar to the description of the above implementations of method and has similar beneficial effects as that of the above implementations of method. The technical details not disclosed in the implementations of the memory device of the present application should be understood with reference to the description of the implementations of the method of the present application.

The implementations of the present application also provide a memory system, which may be the memory system described above in FIG. 1. The memory system may include the memory device provided by the present application and a memory controller coupled to the memory device and configured to control the memory device.

The description of the implementations of the memory system is similar to the description of the above implementations of the method and has similar beneficial effects as that of the above implementations of the method. The technical details not disclosed in the implementations of the memory system of the present application should be understood with reference to the description of the implementations of the method of the present application.

In this application, the terms "first" and "second" are used for description only and are not intended to indicate or imply relative importance. The term "at least one" means one or more. The term "multiple" means two or more, unless otherwise expressly defined.

The foregoing are only implementations of the present application and are not intended to limit the application. Any modification, equivalent substitution, improvement, etc., made within the spirit and principles of the present application shall be included in the scope of protection of the present application.

What is claimed is:

1. A method for operating a memory, comprising:
determining a storage state of a reference memory cell;
determining a discharge duration of a sensing node corresponding to a target memory cell based on the storage state of the reference memory cell; and
reading the target memory cell based on the discharge duration of the sensing node corresponding to the target memory cell to obtain read results;
wherein the target memory cell and the reference memory cell are located in a same string and are adjacent, and programming order of the reference memory cell is after that of the target memory cell.

2. The method of claim 1, wherein determining the discharge duration of the sensing node corresponding to the target memory cell based on the storage state of the reference memory cell comprises:
determining a storage state range in which the storage state of the reference memory cell is located, wherein the storage state range includes a first storage state range and a second storage state range, and storage states in the first storage state range are lower than storage states in the second storage state range; and
determining the discharge duration of the sensing node corresponding to the target memory cell according to the storage state range of the reference memory cell.

3. The method of claim 2, wherein a discharge duration corresponding to the first storage state range is smaller than a default discharge duration of the sensing node, and a discharge duration corresponding to the second storage state range is larger than the default discharge duration of the sensing node.

4. The method of claim 1, wherein determining the storage state of the reference memory cell comprises:
reading the reference memory cell based on a default discharge duration of the sensing node to obtain the storage state of the reference memory cell.

5. The method of claim 1, wherein before determining the storage state of the reference memory cell, the method further comprises:
reading a page where the target memory cell is located; and
performing a default-read hard decoding in response to a fail bit count (FBC) of the page being greater than a first preset value;
wherein determining a storage state of a reference memory cell comprises:
determining the storage state of the reference memory cell in response to default-read hard decoding failure.

6. The method of claim 5, wherein before determining the storage state of the reference memory cell, the method further comprises:
performing a best-read hard decoding in response to default-read hard decoding failure;
wherein determining a storage state of a reference memory cell comprises:
determining the storage state of the reference memory cell in response to best-read hard decoding failure; and
wherein reading the target memory cell based on the discharge duration of the sensing node corresponding to the target memory cell comprises:
reading the target memory cell based on the discharge duration of the sensing node corresponding to the target memory cell and a best-read voltage.

7. The method of claim 5, wherein before determining the storage state of the reference memory cell, the method further comprises:
performing a best-read hard decoding in response to default-read hard decoding failure; and
performing a best-read soft decoding in response to best-read hard decoding failure;

wherein determining a storage state of a reference memory cell comprises:
determining the storage state of the reference memory cell in response to best-read soft decoding failure.

8. The method of claim 7, wherein reading the target memory cell based on the discharge duration of the sensing node corresponding to the target memory cell to obtain read results comprises:
reading the target memory cell based on the discharge duration of the sensing node corresponding to the target memory cell, a first soft read voltage less than a best-read voltage and a second soft read voltage larger than the best-read voltage to obtain soft data corresponding to the target memory cell; and
determining read results corresponding to the target memory cell based on the soft data and hard data corresponding to the target memory cell, wherein the hard data corresponding to the target memory cell is obtained by reading the target memory cell based on the best-read voltage.

9. The method of claim 8, wherein the hard data corresponding to the target memory cell is obtained by reading the target memory cell based on the discharge duration of the sensing node corresponding to the target memory cell and the best-read voltage.

10. A memory, comprising:
a memory cell array comprising a plurality of strings, wherein the strings comprise a plurality of memory cells;
a peripheral circuit coupled to the memory cell array and configured to:
determine a storage state of a reference memory cell;
determine a discharge duration of a sensing node corresponding to a target memory cell based on the storage state of the reference memory cell; and
read the target memory cell based on the discharge duration of the sensing node corresponding to the target memory cell to obtain read results;
wherein the target memory cell and the reference memory cell are located in a same string and are adjacent, and programming order of the reference memory cell is after that of the target memory cell.

11. The memory of claim 10, wherein the peripheral circuit is configured to:
determine a storage state range in which the storage state of the reference memory cell is located, wherein the storage state range includes a first storage state range and a second storage state range, and storage states in the first storage state range are lower than storage states in the second storage state range; and
determine the discharge duration of the sensing node corresponding to the target memory cell according to the storage state range of the reference memory cell.

12. The memory of claim 11, wherein a discharge duration corresponding to the first storage state range is smaller than a default discharge duration of the sensing node, and a discharge duration corresponding to the second storage state range is larger than the default discharge duration of the sensing node.

13. The memory of claim 10, wherein the peripheral circuit is configured to:
read the reference memory cell based on a default discharge duration of the sensing node to obtain the storage state of the reference memory cell.

14. The memory of claim 10, wherein the peripheral circuit is further configured to:
read a page where the target memory cell is located;
perform a default-read hard decoding in response to a fail bit count (FBC) of the page being greater than a first preset value; and
determine the storage state of the reference memory cell in response to default-read hard decoding failure.

15. The memory of claim 14, wherein the peripheral circuit is further configured to:
perform a best-read hard decoding in response to default-read hard decoding failure;
determine the storage state of the reference memory cell in response to best-read hard decoding failure; and
read the target memory cell based on the discharge duration of the sensing node corresponding to the target memory cell and a best-read voltage.

16. The memory of claim 14, wherein the peripheral circuit is further configured to:
perform a best-read hard decoding in response to default-read hard decoding failure;
perform a best-read soft decoding in response to best-read hard decoding failure; and
determine the storage state of the reference memory cell in response to best-read soft decoding failure.

17. The memory of claim 16, wherein the peripheral circuit is further configured to:
read the target memory cell based on the discharge duration of the sensing node corresponding to the target memory cell, a first soft read voltage less than a best-read voltage and a second soft read voltage larger than the best-read voltage, to obtain soft data corresponding to the target memory cell; and
determine read results corresponding to the target memory cell based on the soft data and hard data corresponding to the target memory cell, wherein the hard data corresponding to the target memory cell is obtained by reading the target memory cell based on the best-read voltage.

18. The memory of claim 17, wherein the hard data corresponding to the target memory cell is obtained by reading the target memory cell based on the discharge duration of the sensing node corresponding to the target memory cell and the best-read voltage.

19. A memory system, comprising:
one or more memories; and
a memory controller coupled to the one or more memories and configured to control the memories;
wherein one of the one or more memories comprises:
a memory cell array comprising a plurality of strings, wherein the strings comprise a plurality of memory cells;
a peripheral circuit coupled to the memory cell array and configured to:
determine a storage state of a reference memory cell;
determine a discharge duration of a sensing node corresponding to a target memory cell based on the storage state of the reference memory cell; and
read the target memory cell based on the discharge duration of the sensing node corresponding to the target memory cell to obtain read results;
wherein the target memory cell and the reference memory cell are located in a same string and are adjacent, and programming order of the reference memory cell is after that of the target memory cell.

* * * * *